(12) United States Patent
Li et al.

(10) Patent No.: US 7,965,452 B2
(45) Date of Patent: Jun. 21, 2011

(54) HIGH MAGNIFICATION COMPACT ZOOM LENS

(75) Inventors: Dayong Li, Saitama (JP); Toru Nara, Saitama (JP)

(73) Assignee: Tamron Co., Ltd., Hasunuma, Minuma-ku, Saitama-shi, Saitama (JP)

( * ) Notice: Subject to any disclaimer, the term of this patent is extended or adjusted under 35 U.S.C. 154(b) by 19 days.

(21) Appl. No.: 12/457,141

(22) Filed: Jun. 2, 2009

(65) Prior Publication Data

US 2009/0303609 A1    Dec. 10, 2009

(30) Foreign Application Priority Data

Jun. 4, 2008  (JP) ................. 2008-147126
Jun. 4, 2008  (JP) ................. 2008-147127
Jun. 4, 2008  (JP) ................. 2008-147128

(51) Int. Cl.
*G02B 15/14* (2006.01)
(52) U.S. Cl. ............................ 359/687; 359/686
(58) Field of Classification Search .......... 359/683, 359/684, 686, 687
See application file for complete search history.

(56) References Cited

U.S. PATENT DOCUMENTS

| | | | |
|---|---|---|---|
| 5,612,825 A * | 3/1997 | Horiuchi et al. | 359/687 |
| 7,245,442 B2 | 7/2007 | Ohtake | |
| 7,248,417 B2 * | 7/2007 | Miyazawa | 359/686 |
| 7,616,386 B2 * | 11/2009 | Kimura | 359/690 |

FOREIGN PATENT DOCUMENTS

| | | |
|---|---|---|
| JP | 2007-003776 | 1/2007 |
| JP | 2007-127694 | 5/2007 |
| JP | 2007-212847 | 8/2007 |

* cited by examiner

*Primary Examiner* — David N Spector
(74) *Attorney, Agent, or Firm* — Jacobson Holman PLLC

(57) ABSTRACT

The present invention is directed to high magnification compact zoom lenses that are reduced in diameter of groups of lens pieces closer to the imaging plane to provide downsized lightweight zoom lenses of magnification as high as 20 diameters, with an image stabilizer or vibration compensating mechanism being also reduced in dimensions. An exemplary improved high magnification zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis. The zoom lens satisfies the requirements as defined in the following formulae: f3/f4>2.0 and v4>65 where f3 is a focal length of the third lens group G3, f4 is the focal length of the fourth lens group, v4 is an average of Abbe contrasts of all the convex lens pieces in the fourth lens group G4.

5 Claims, 15 Drawing Sheets

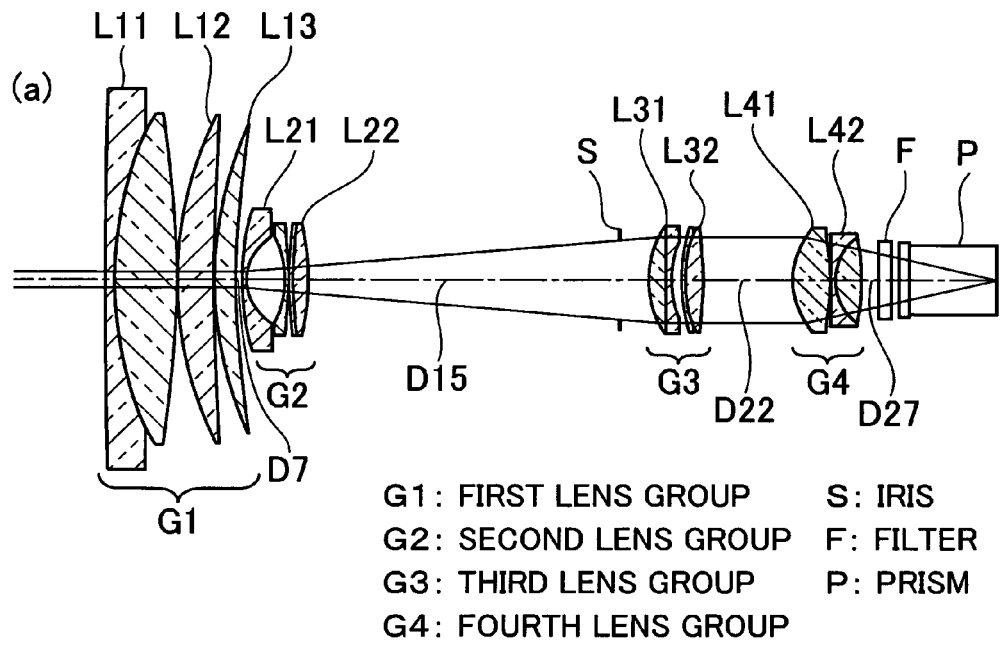
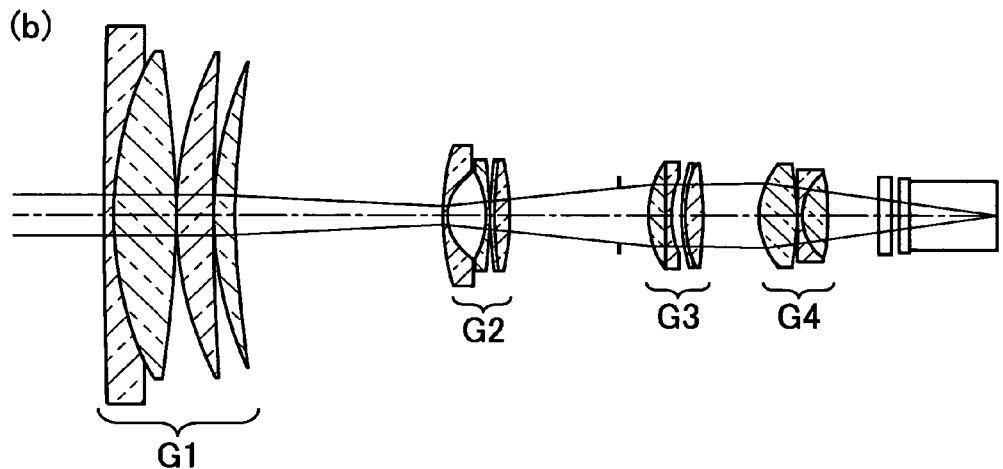
FIG.6
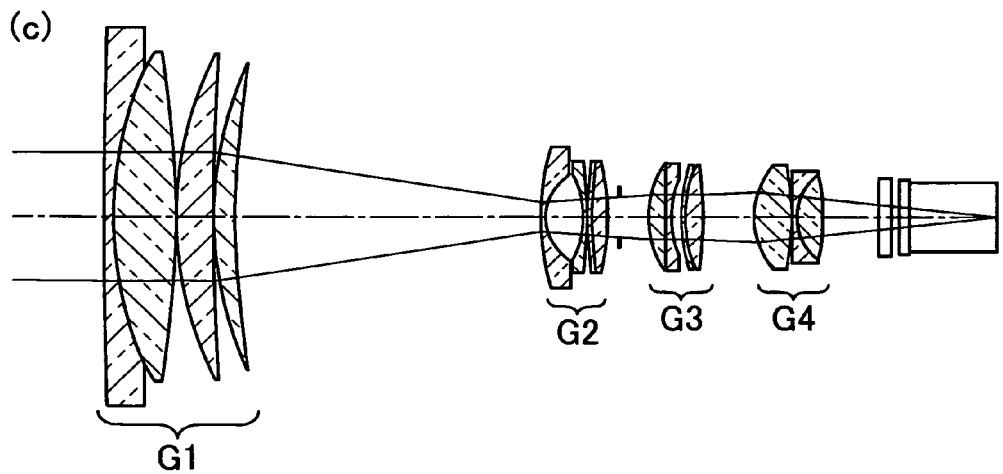

HIGH MAGNIFICATION COMPACT ZOOM LENS

FIELD OF THE INVENTION

The present invention relates to compact zoom lenses of magnification as high as 20 diameters that are suitable for optical apparatuses, such as video cameras, digital still cameras, and the like, having a plurality of imaging devices integrated therein.

In general, cameras having an increased number of integrated imaging are required to correspondingly have a longer back focus, namely, a longer distance from the rearmost surface of the lens to the imaging plane. In one well known example of wide-view zoom lenses suitable for video cameras, digital still cameras, and the like that use an opto-electrical converter to opto-electrically convert rays reflected from the subject into signals, there are four groups of lens pieces arranged to exert their respective optical attributes of refractive power like positive-negative-positive-positive in this order.

Typically, with lens optics of high zoom ratio, an image obtained at the telephoto end is reduced in angle of field and increased in magnification, which results in minute tremors of the hand(s) causing the image to blur. One typical solution to such a blur of the image is an image stabilizer or an optical vibration compensation mechanism that, for the purpose of correcting blur, allows part of the lens optics to be shifted in directions perpendicular to the optical axis to guide incident beams so that they can be imaged in shifted area perpendicular to the optical axis within the imaging plane.

In order to compensate for varied imaging positions due to tremors of the hand(s), part of the third group of lens pieces, for instance, three of the lens pieces may be moved in directions orthogonal to the optical axis (see Patent Document 1 listed below).

In another prior art embodiment where the improved anti-vibrating group of lens pieces is successfully downsized, part of the third group of lens pieces, namely, only two of the lens pieces are to be moved in directions orthogonal to the optical axis.

Patent Document 1
  Japanese Patent Preliminary Publication of Unexamined
    Application No. 2007-3776
Patent Document 2
  Japanese Patent Preliminary Publication of Unexamined
    Application No. 2007-127694
Patent Document 3
  Japanese Patent Preliminary Publication of Unexamined
    Application No. 2007-212847

In the zoom lens disclosed in Patent Document 1, as it is displaced from the wide-angle end to the telephoto end, four of the lens groups make their respective separate motions; i.e., the second group of lens pieces are moved toward the imaging plane, the fourth group of lens pieces are shifted to compensate for a variation in the imaging plane, and the first and third groups of lens pieces are fixed in positions along the optical axis where these four lens groups are arranged so as to exert their respective optical attributes of refractive power as positive, negative, positive, and positive in order on the closest to the subject first basis. The third lens group includes the leading subset of lens pieces of negative refractivity followed by the trailing subset of lens pieces of positive refractivity closer to the imaging plane, and shifting the positive subset of lens pieces in directions orthogonal to the optical axis permits the incident beams to be guided and imaged in shifted area orthogonal to the optical axis where the optics of the zoom lens satisfies requirements defined in numerical relations.

The numerical relations can be expressed in the formulae as follows:

$$1.4 < |f3n|/f3 < 3 \quad (1)$$

$$-0.3 < (Rn+Rp)/(Rn-Rp) < 0.3 \quad (2)$$

$$0 < (Rp1+Rp2)/(Rp1-Rp2) < 2 \quad (3)$$

$$0.42 < |f2|/(fw \cdot ft)^{1/2} < 0.5 \quad (4)$$

$$0.8 < Dt/Z2 < 1.2 \quad (5)$$

where f3n is a focal length of the negative subset of lens pieces in the third lens group, f2 is the focal length of the second lens group, f3 is the focal length of the third lens group, fw is the focal length of the zoom lens at the wide-angle end, ft is the focal length of the zoom lens at the telephoto end, Rp1 is a radius of curvature of the front surface of the rearmost positive lens piece in the positive subset of lens pieces of the third lens group, Rp2 is the radius of curvature of the opposite or rear surface of the rearmost positive lens piece in the positive subset of lens pieces of the third lens group, Dt is a distance along the optical axis from an aperture stop to the rear surface of the rearmost lens piece in the fourth lens group at the telephoto end, and Z2 is a displacement of the second group of lens pieces when the zoom lens is displaced from the wide-angle end to the telephoto end.

A zooming feature of the zoom lens disclosed in the cited Patent Document 1 has negative and positive subsets of lens pieces disposed in the third lens group, with three of component lens pieces in total in the positive subset. These three lens pieces, which are greater in effective diameter than those in the negative subset, are accordingly greater in weight, and therefore, an image stabilizer or vibration compensation mechanism should resultantly be increased in dimensions. An additional problem is that, in order to shorten the focusing distance or the minimum working distance from the subject to the zoom lens at its telephoto end, the fourth lens group should accordingly have the greater effective diameter, resulting in increased power consumption required to move the fourth lens group for the focusing.

In the zoom lens disclosed in Patent Document 2, as it is displaced from the wide-angle end to the telephoto end, four of the lens groups make their respective separate motions; i.e., the second group of lens pieces are moved toward the imaging plane, the fourth group of lens pieces are shifted to compensate for a variation in the imaging plane, and the first and third groups of lens pieces are fixed in positions along the optical axis where these four lens groups are arranged so as to exert their respective optical attributes of refractive power as positive, negative, positive, and positive in this order. The third lens group includes the leading subset of lens pieces of negative refractivity followed by the trailing subset of lens pieces of positive refractivity closer to the imaging plane, and shifting the positive subset of lens pieces in directions orthogonal to the optical axis permits the incident beams to be guided and imaged in shifted area orthogonal to the optical axis where the optics satisfies requirements defined in numerical relations.

The numerical relations featured by the zoom lens with the quartet-lens optics can be expressed in the formulae as follows:

$$1.2 < |f3n|/f4 \quad (6)$$

$$0.9 < f3p/f4 \quad (7)$$

$$0.2 < |1/Ra + 1/Rb| \cdot fw < 0.4 \quad (8)$$

where f3n is a focal length of the negative subset of lens pieces in the third lens group, f3p is the focal length of the positive subset of lens pieces in the third lens group, f4 is the focal length of the fourth lens group, fw is the focal length of the entire optics of the zoom lens at the wide-angle end, Ra is a radius of curvature of the front surface of a negative lens piece in the negative subset of the third lens group, and Rb is the radius of curvature of the front surface of a positive lens piece in the negative subset of the third lens group.

A zooming feature of the zoom lens disclosed in the cited Patent Document 2 has negative and positive subsets of lens pieces disposed in the third lens group, with two of cemented doublets disposed in the positive subset. These two lens pieces in the positive subset, which are greater in effective diameter than those in the negative subset, are accordingly greater in weight, and therefore, an image stabilizer or a vibration compensating mechanism should resultantly be increased in dimensions. An additional problem is that, in order to shorten the focusing distance of the zoom lens at its telephoto end, the fourth lens group should have a greater effective diameter, resulting in increased power consumption required to move the fourth lens group for the focusing.

In the zoom lens disclosed in Patent Document 3, the four lens groups are arranged so as to exert their respective optical attributes of refractive power as positive, negative, positive, and positive in order on the closest to the subject first basis, where the third lens group includes a fixed subset of lens pieces of negative refractivity and a movable subset of lens pieces of positive refractivity that can be shifted in directions orthogonal to the optical axis so as to compensate for varied imaging positions resulted from the optical axis perturbed. The optics of the zoom lens satisfies requirements defined in numerical relations.

The numerical relations featured by the zoom lens with the quartet-lens optics can be expressed in the formulae as follows:

$$-2<SAB \cdot FN^2 \cdot fw/f32<-0.1 \qquad (9)$$

$$-0.9<SAA/SAB<-0.003 \qquad (10)$$

$$|S2/f31|\leq0.15 \qquad (11)$$

$$S2/f32\leq0.2 \qquad (12)$$

where fw is a focal length of the entire optics of the zoom lens at the wide-angle end, FN is a maximized F number of the zoom lens at the wide-angle end, SAA is a numerical representation of spherical aberration caused in the zoom lens at the wide-angle end with the maximized F number under the condition of full aperture as a result of replacing an aspherical surface of the lens piece(s) in the negative subset of the third lens group with its paraxial spherical surface, SAB is the numerical representation of the spherical aberration caused in the lens optics at the wide-angle end with the maximized F number resulted from replacing the aspherical surface of the lens piece(s) in the positive subset of the third lens group with its paraxial spherical surface, f31 is the focal length of the negative subset of the third lens group, f32 is the focal length of the positive subset of third lens group, and S2 is an interval of the air gap between the second and third lens groups of the zoom lens at the telephoto end.

In the zoom lens as disclosed in the cited Patent Document 3, the aperture stop is disposed in the third group of lens pieces, specifically, it is between the negative subset of lens pieces closer to the subject and the positive subset of lens pieces closer to the imaging plane. The positive subset include two of the component lens pieces, which are greater in effective diameter than those in the negative subset and accordingly greater in weight, and therefore, an image stabilizer or a vibration compensating mechanism should resultantly be increased in dimensions. An additional problem is that, in order to shorten the closest focusing distance from the subject to the zoom lens at its telephoto end, the fourth lens group should accordingly have the greater effective diameter, resulting in increased power consumption required to move the fourth lens group for the focusing.

The present invention is made to overcome the aforementioned problems in the prior art high magnification compact zoom lenses, and accordingly, it is an object of the present invention to provide the improved compact zoom lens of magnification as high as 20 diameters that is reduced in both dimensions and weight by providing component lens groups of decreased diameter in positions closer to the imaging plane and that has its image stabilizer or vibration compensating mechanism reduced in dimensions as well.

It is another object of the present invention to provide the improved high magnification compact zoom lens that has the reduced focusing distance at the telephoto end down to ten times as long as or rather shorter than the focal length at the telephoto end.

It is still another object of the present invention to provide the improved high magnification compact zoom lens that has one or more of the component lens pieces formed with an aspherical surface on at least one of the opposite sides thereof in the lens group(s) closer to the imaging plane, so as to satisfactorily compensate for chromatic aberration and spherical aberration.

It is further another object of the present invention to provide the improved high magnification wide-view zoom lens that is capable of satisfactorily compensating for various types of aberration and that attains an enhanced zooming ratio as high as 20 diameters and a greater angle of view of 75 degrees or even wider at the wide-angle end.

It is yet another object of the present invention to provide the improved zoom lens that has downsized anti-vibration lens group driven with the reduced power and that can achieve a well-balanced compensation for various types of aberration throughout the full zoom range.

SUMMARY OF THE INVENTION

In a first aspect of the present invention, a high magnification compact zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis. The zoom lens is characterized in that it satisfies the requirements as defined in the following formulae:

$$f3/f4>2.0 \qquad (13)$$

$$v4>65 \qquad (14)$$

where f3 is a focal length of the third lens group G3, f4 is the focal length of the fourth lens group G4, and v4 is an average of Abbe constants of all the convex lens pieces in the fourth lens group G4.

In this aspect of the present invention, the fourth lens group G4 has one or more of the lens pieces provided with an aspherical surface on at least one of the opposite sides thereof.

In a second aspect of the present invention, a high magnification compact zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis. The zoom lens is characterized in that it satisfies the requirements as defined in the following formulae:

$$f3/f4>2.0 \tag{13}$$

$$6.0<BFw/Y<8.0 \tag{15}$$

where f3 is a focal length of the third lens group G3, f4 is the focal length of the fourth lens group G4, BFw is a distance between a rearmost surface of the fourth lens group G4 (that is, the rearmost surface of the trailing lens piece of the forth lens group G4) and the imaging plane at the wide-angle end, and Y is a height of the greatest image created in the imaging plane.

In a third aspect of the present invention, a high magnification wide-view zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis. The zoom lens is characterized in that it satisfies the requirements as defined in the following formula:

$$|f1/f2|>6.5 \tag{16}$$

where f1 is focal length of the first lens group G1, and f2 is the focal length of the second lens group G2.

In the third aspect of the invention, the high magnification wide-view zoom lens satisfies the requirements as defined in the following formula:

$$0.4<|f1_1/(v1 \times fw)|<0.6 \tag{17}$$

where $f1_1$ is the focal length of the foremost or leading lens piece of the first lens group G1, v1 is an Abbe constant of the foremost or leading lens piece of the first lens group G1, and fw is the focal length of the zoom lens at the wide-angle end.

In a fourth aspect of the present invention, a high magnification wide-view zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis. The zoom lens is characterized in that it satisfies the requirements as defined in the following formulae:

$$|f1/f2|>6.5 \tag{16}$$

$$0.4<|f1_1/(v1 \times fw)|<0.6 \tag{17}$$

where f1 is a focal length of the first lens group G1, f2 is the focal length of the second lens group G2, $f1_1$ is the focal length of the foremost or leading lens piece of the first lens group G1, v1 is an Abbe constant of the foremost lens piece of the first lens group G1, and fw is the focal length of the zoom lens at the wide-angle end. The zoom lens is also characterized in that second lens group G2 has one or more of the lens pieces provided with an aspherical surface on at least one of the opposite sides thereof.

In a fifth aspect of the invention, a wide-view anti-vibration zoom lens has four groups of lens pieces, namely, the first or leading lens group G1 of positive refractivity in the foremost position closer to the subject, the second lens group G2 of negative refractivity, the third lens group G3 of positive refractivity, and the fourth lens group G4 of positive refractivity in the rearmost position closer to the imaging plane, all arranged in this order. In displacing the entire lens optics of the zoom lens from the wide-angle end to the telephoto end, the second lens group G2 are moved toward the imaging plane and the fourth lens group G4 are moved to compensate for a varied position of the resultant image while the first and third lens groups, G1 and G3, have their respective positions fixed along the optical axis.

The zoom lens being characterized in that the third lens group G3 has a fixed lens subset L31 of a convexo-concave cemented lens followed by a movable lens subset L32 of a concavo-convex cemented lens, the movable lens subset L32 being shifted in directions orthogonal to the optical axis so as to cause incident beams to be imaged in shifted position, and the fixed lens subset L31 has its convex surface of the greater curvature faced closest to the subject and its concave surface of the greater curvature faced closest to the imaging plane, and that the zoom lens satisfies the requirements as defined in the following formulae:

$$H31>H32 \tag{18}$$

where H31 is a height of part of incident beams on the foremost surface of the leading lens piece in the fixed lens subset L31 of the third lens group G3 on or above the optical axis at the wide-angle end, and H32 is the height of part of the incident beams on the foremost surface of the leading lens piece in the movable or image-stabilizing lens subset L32 of the third lens group G3 on or above the optical axis at the wide-angle end, and $$-0.12<(R31-R32)/(R31+R32)<0.12 \tag{19}$$

where R31 is a radius of curvature of the convex surface of the leading lens piece closest to the subject in the fixed lens subset L31 of the third lens group G3, and R32 is the radius of curvature of the concave surface of the trailing lens piece closest to the imaging plane in the fixed lens subset L31 of the third lens group G3.

In this aspect of the present invention, the fixed lens subset L31 in the third lens group has one or more of the lens pieces provided with an aspherical surface on at least one of the opposite sides thereof so as to compensate for comatic aberration and spherical aberration.

<Requirements of the Invention>

Assuming that f3 is the focal length of the third lens group G3, and f4 is the focal length of the fourth lens group G4, the requirement as defined in the formula (13) f3/f4>2.0 represents a condition in which the third and fourth lens groups can be downsized and reduced in weight, and simultaneously, the closest focusing distance from the subject to the leading end of the zoom lens can be ten times as long as or even shorter than the focal length of the zoom lens at the telephoto end. Thus, if the quotient of the focal length of the third lens group G3 divided by that of the fourth lens group G4 is equal to or smaller than the lower limit as given in the formula (13), both of the improved features of the invention are unattainable, that is, the third and fourth lens groups cannot be downsized and reduced in weight, and the focusing distance cannot be ten times as long as or even shorter than the focal length of the zoom lens at the telephoto end.

Assuming now that v4 is the average of Abbe constants of all the convex lens pieces in the fourth lens group G4, the requirement as defined in the formula (14) v4>65 expresses a condition in which chromatic aberration and spherical aberration are well compensated when the zoom lens at the telephoto end has the focus set either at the infinitive distance or at the closest focusing distance. Thus, the value of v4 is equal to or smaller than the lower limit as given in the formula (14), the zoom lens at the telephoto end, which is in focus either at the infinity point or the closest focusing distance, cannot compensate for the chromatic aberration and the spherical aberration.

The requirement as defined in the formula (15) 6.0<BFw/Y<8.0 expresses a condition in which the zoom lens is permitted to have a long back focus and the fourth lens group reduced in dimensions. If BFw/Y is equal to or smaller than the lower limit of 6.0, the back focus comes short of the position of a 3-CCD fixed dichroic prism. In addition, if BFw, which is a distance from the rearmost surface of the trailing lens piece in the fourth lens group G4 to the imaging plane, exceeds the upper limit of 8.0 at the wide-angle end, that distance between the imaging plane and the lens surface closest to the imaging plane is extended at the wide-angle end, and a focusing subset of lens pieces in the fourth lens group G4 inevitably has a greater diameter in order to retain the equalized performance in terms of luminous factors such as light loss, which resists the intended effect of downsizing.

Providing one or more of the lens pieces in the fourth lens group G4 with an aspherical surface at least one of the opposite sides thereof is the condition of having the zoom lens effect well-balanced compensation for the comatic aberration and the spherical aberration.

The formula (16) defined as $|f1/f2|>6.5$ represents conditions required to widen an angle of view and to effectively correct various types of aberration such as distortion aberration, astigmatism, and the like so as to obtain satisfactory optical performance. If the absolute value of f1/f2 is equal to or smaller than the lower limit given in the formula (16), it is difficult to correct the comatic aberration and the distortion aberration, especially, these of aberration caused in the zoom lens at the wide-angle end.

The formula (17) defined as $0.4<|f1_1/(v1 \times fw)|<0.6$ expresses conditions of optimizing the power and Abbe constant of the first lens group G1 and of satisfactorily compensating for chromatic aberration caused in the zoom lens at high magnifications. If the absolute value of $f1_1/(v1 \times fw)$ is equal to or smaller than the lower limit given in the formula (17), it is difficult to correct the chromatic aberration in the longer wavelength range, and if it exceeds the higher limit in the formula (17), it is hard to compensate for the chromatic aberration in the shorter wavelength range, resultantly leading to a difficulty in widening the angle of view.

Providing one or more of the lens pieces in the second lens group G2 with an aspherical surface on at least one of the opposite sides thereof enables to efficiently compensate for the distortion aberration and astigmatism caused in the zoom lens at the wide-angle end.

The formula (18) is for reducing an effective diameter of the anti-vibration lens subset. If it does not meet the requirement defined in the formula (18), the anti-vibration lens subset must have a greater diameter, and this causes the resultant wide-view anti-vibration zoom lens to increase in both dimensions and weight and have to have a higher-powered driving mechanism for such anti-vibration lens subset.

The formula (19) is given for the purpose of attaining the anti-vibration lens subset of reduced effective diameter and satisfactorily correcting the comatic aberration and the spherical aberration as well. If the quotient of (R31−R32)/(R31+R32) is equal to or smaller than the lower limit as given in the formula (19), the anti-vibration lens subset, which is reduced in power, has to shift more for the same effect and be followed by the succeeding lens subsets that resultantly necessitate to increase in dimensions, which is disadvantageous in downsizing the zoom lens. If it exceeds the upper limit given in the formula (19), the anti-vibration lens subset, which is raised in power, results in likely failing to compensate for the comatic aberration and the spherical aberration.

Effects of the Invention

In the high magnification compact zoom lens according to the present invention, the groups of lens pieces closer to the imaging plane are reduced in diameter to have the resultant zoom lens downsized and reduced in weight, retaining a magnification as high as 20 diameters, and the integrated image stabilizer or the vibration compensating mechanism is also reduced in dimensions.

Also in the high magnification compact zoom lens according to the present invention, the closest focusing distance at the telephoto end is ten times as long as or even smaller than the focal length at the telephoto end.

Additionally, in the high magnification compact zoom lens according to the present invention, one or more of the lens pieces in any lens group closer to the imaging plane has an aspherical surface on at least one of the opposite sides thereof so as to satisfactorily compensate for the chromatic aberration and the aspherical aberration.

In the high magnification wide-view zoom lens according to the present invention, various types of aberration are corrected well, and the resultant zoom lens is enhanced in magnification as high as 20 diameters and has a field of view of 75 degrees or even wider at the wide-angle end.

In the wide-view anti-vibration zoom lens according to the present invention, magnification ratios can be raised as high as those enabled in cameras that employ imaging devices, and image blur resulted from tremors of the hand(s) and/or other vibrations can be optically corrected. In addition, well-balanced compensation for various types of aberration can be guaranteed throughout the zoom range, and the anti-vibration lens subset reduced in diameter necessitates a reduced power to actuate them.

BRIEF DESCRIPTION OF THE DRAWINGS

FIG. 6 is a sectional view showing the optics of a second preferred embodiment of the wide-view anti-vibration zoom lens in accordance with the present invention.

BEST MODE OF THE INVENTION

Embodiment 1

Table 1 below shows various numerical data on a first preferred embodiment of a wide-view anti-vibration zoom lens according to the present invention where all the values are scaled to a normalized minimum focal length of 1 millimeter (mm). In Table 1, S is a number of surfaces, ASPH designates an aspherical surface, R is a radius of curvature in millimeters (mm), D is a thickness or a distance in millimeters (mm), Nd is a refractive index of the d-line ($\lambda$=587.6 nm), and ABv is an Abbe constant in relation with the d-line.

Aspherical surfaces can be expressed as in the following formula (20):

$$z = \frac{y^2}{R(1 + \sqrt{1 - (1+K)y/R^2})^2} + Ay^4 + By^6 + Cy^8 + Dy^{10} \quad (20)$$

where z is a depth of the aspherical surfaces, y is a height, R is a paraxial radius of curvature, K, A, B, C, and D denote a degree of asphericity, and the aspherical surfaces have their respective degrees of asphericity as listed in Table 1 below.

TABLE 1

| S | R | D | Nd | ABv |
|---|---|---|---|---|
| 1 | 185.6556 | 0.4028 | 1.90366 | 31.31 |
| 2 | 13.4778 | 2.8310 | 1.49700 | 81.61 |
| 3 | −45.0882 | 0.0355 | | |
| 4 | 14.5207 | 1.5745 | 1.72916 | 54.67 |
| 5 | 73.3948 | 0.0355 | | |
| 6 | 16.5815 | 1.0146 | 1.83481 | 42.72 |
| 7 | 41.1397 | (D7) | | |
| 8 ASPH | 13.3663 | 0.0474 | 1.53610 | 41.20 |
| 9 | 10.7661 | 0.1896 | 1.88300 | 40.80 |
| 10 | 2.2512 | 1.7006 | | |
| 11 | −3.6114 | 0.1422 | 1.62004 | 36.30 |
| 12 | 5.0993 | 0.7808 | 1.94595 | 17.98 |
| 13 | −21.4719 | (D13) | | |
| Aperture | 0.0000 | 1.1848 | | |
| 15 ASPH | 4.4935 | 0.8294 | 1.68893 | 31.16 |
| 16 | −29.5955 | 0.4739 | 1.83400 | 37.34 |
| 17 | 4.7393 | 0.3324 | | |
| 18 | 5.8020 | 0.1185 | 1.80610 | 33.27 |
| 19 | 3.6662 | 0.7453 | 1.48749 | 70.44 |
| 20 | −28.9053 | (D20) | | |
| 21 ASPH | 3.3229 | 1.4828 | 1.69350 | 53.34 |
| 22 ASPH | −6.7610 | 0.0355 | | |
| 23 | −13.9305 | 0.1185 | 1.83400 | 37.34 |
| 24 | 2.4849 | 1.3766 | 1.49700 | 81.61 |
| 25 | −7.4707 | (D25) | | |
| 26 | 0.0000 | 0.1019 | 1.51680 | 64.20 |
| 27 | 0.0000 | 0.4645 | 1.61800 | 63.39 |
| 28 | 0.0000 | 0.2915 | | |
| 29 | 0.0000 | 0.4028 | 1.51680 | 64.20 |
| 30 | 0.0000 | 3.6730 | 1.51680 | 64.20 |
| 31 | 0.0000 | | | |

Asphericity

NO 8

K: 0.000000
A: 0.289736E−02   B: −.207478E−03   C: 0.990963E−05
D: −.781114E−06

NO 15

K: 0.000000
A: −.963562E−04   B: −.376299E−05   C: −.886104E−05
D: 0.116385E−05

NO 21

K: 0.000000
A: −.777717E−03   B: −.305060E−03   C: 0.758612E−04
D: 0.405168E−05

NO 22

K: 0.000000
A: 0.543664E−02   B: −.931646E−03   C: 0.340591E−03
D: −.317582E−04

| Focal Length | 1.000 | 4.343 | 19.082 |
|---|---|---|---|
| F-Number | 1.6500 | 2.600 | 3.600 |
| 2ω | 76.512 | 19.236 | 4.476 |
| D7 | 0.1659 | 8.0156 | 12.0596 |
| D13 | 12.3677 | 4.5178 | 0.4739 |
| D20 | 3.3875 | 2.1578 | 2.1485 |
| D25 | 0.4229 | 1.6528 | 1.6620 |

Figure 1:
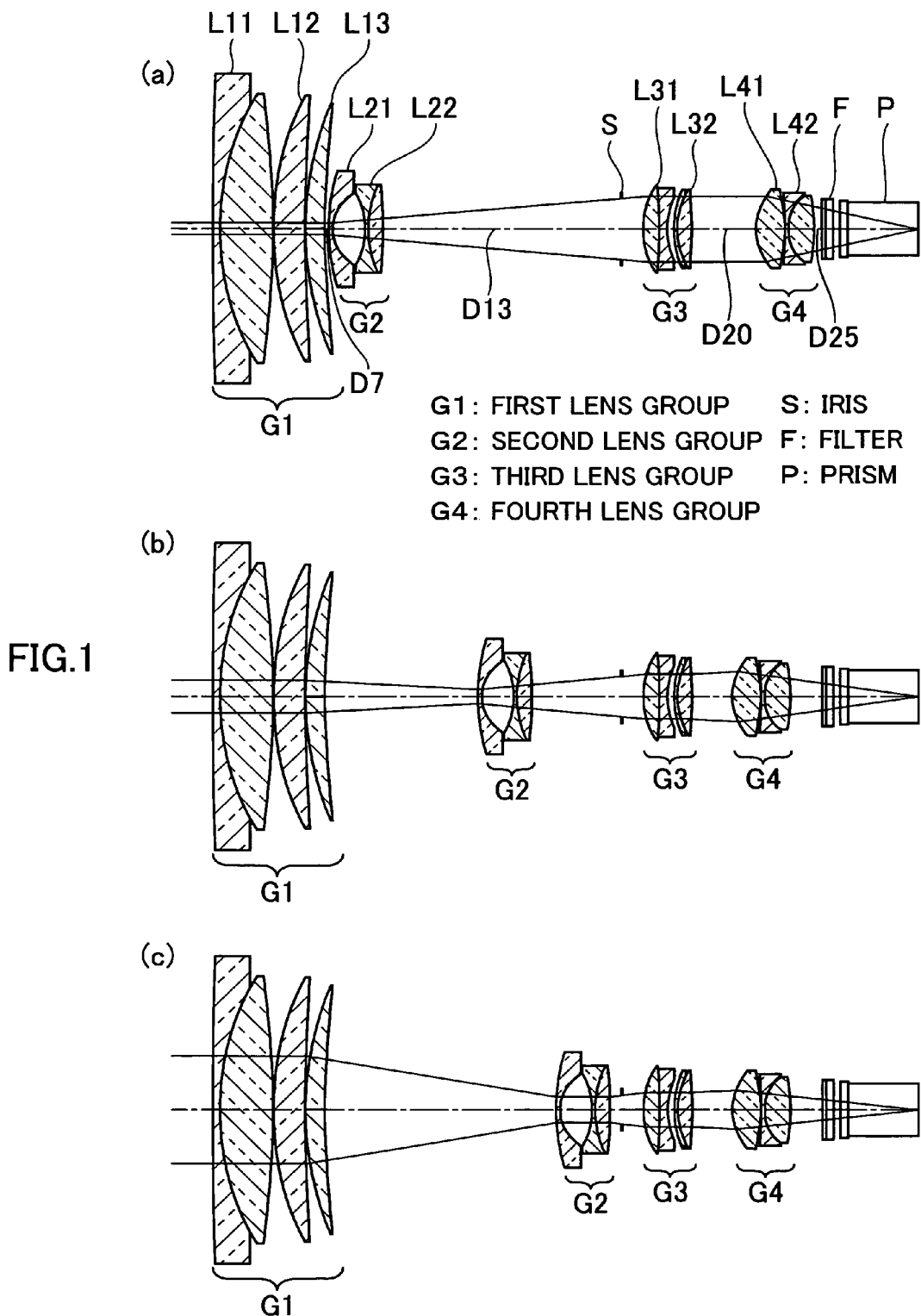
FIG. 1 is a sectional view of optics of a first preferred embodiment of a wide-view anti-vibration zoom lens in accordance with the present invention.

In the first preferred embodiment of the wide-view anti-vibration zoom lens, as shown in FIG. 1, the second lens group G2 to the fourth lens group G4 are respectively moved during the zooming. Alphanumeric symbols D7, D13, D20, and D25 in Table 1 respectively designate intervals from one of the lens group to the next for the varied focal length of the optics during the zooming. The focal length is 1 millimeter (mm) in FIG. 1(a), 4.343 mm in FIG. 1(b), and 19.0828 mm in FIG. 1(c).

Various types of aberration of the first preferred embodiment of the wide-view anti-vibration zoom lens are depicted in FIG. 2 to FIG. 6. In these figures, C, d, e, F and g denote C-line (656.28 nm), d-line (587.56 nm), e-line (546.07 nm), F-line (486.13 nm), and g-line (435.84 nm), respectively.

Figure 2:
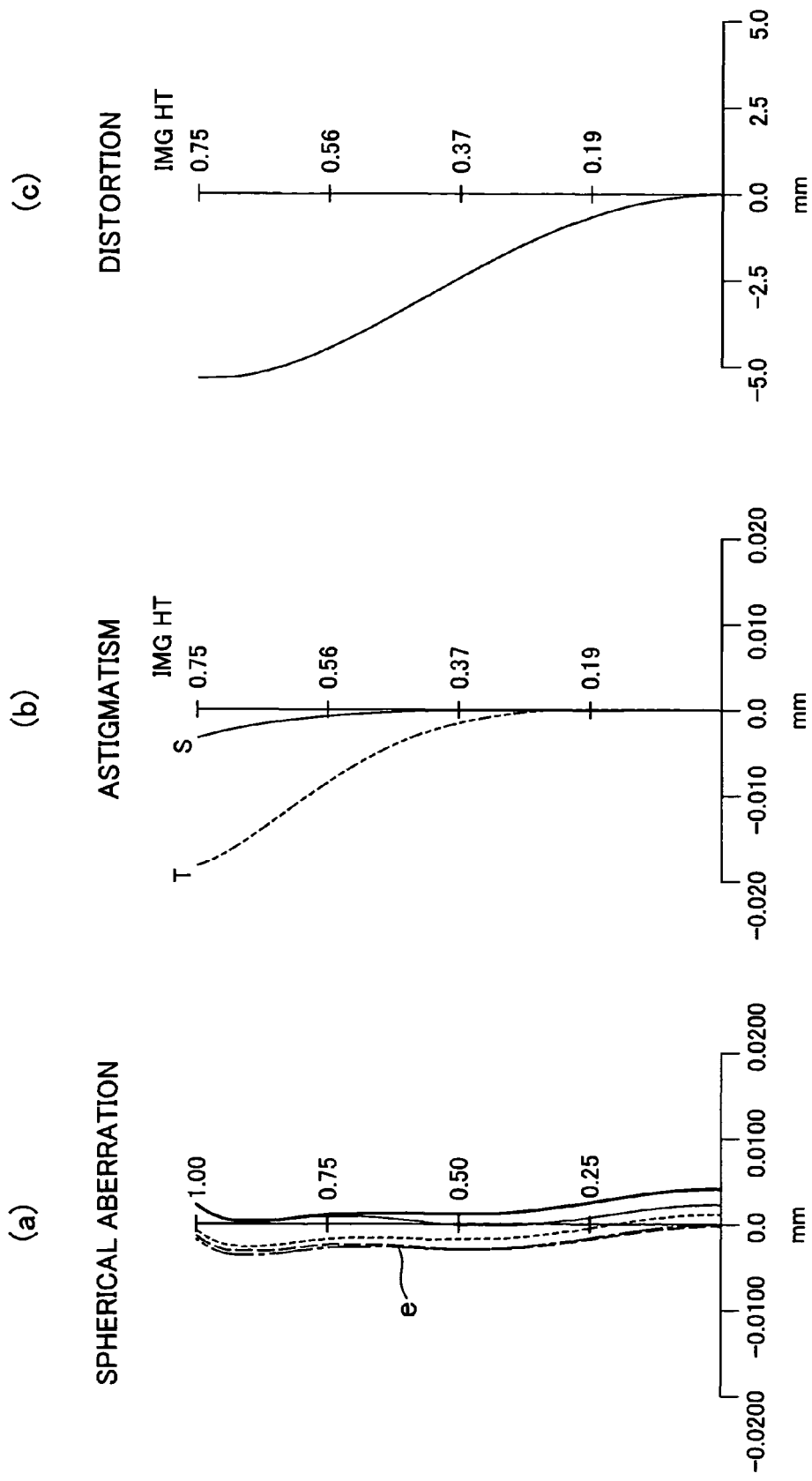
FIG. 2 is a graphical view depicting spherical aberration, astigmatism, and distortion aberration caused in the exemplary wide-view anti-vibration zoom lens at the wide-angle end.

FIG. 2 graphically depicts various types of aberration caused in the zoom lens at the wide-angle end (focal length of 1 mm) where graphs represent (a) spherical aberration, (b) astigmatism, and (c) distortion aberration, respectively.

Figure 3:
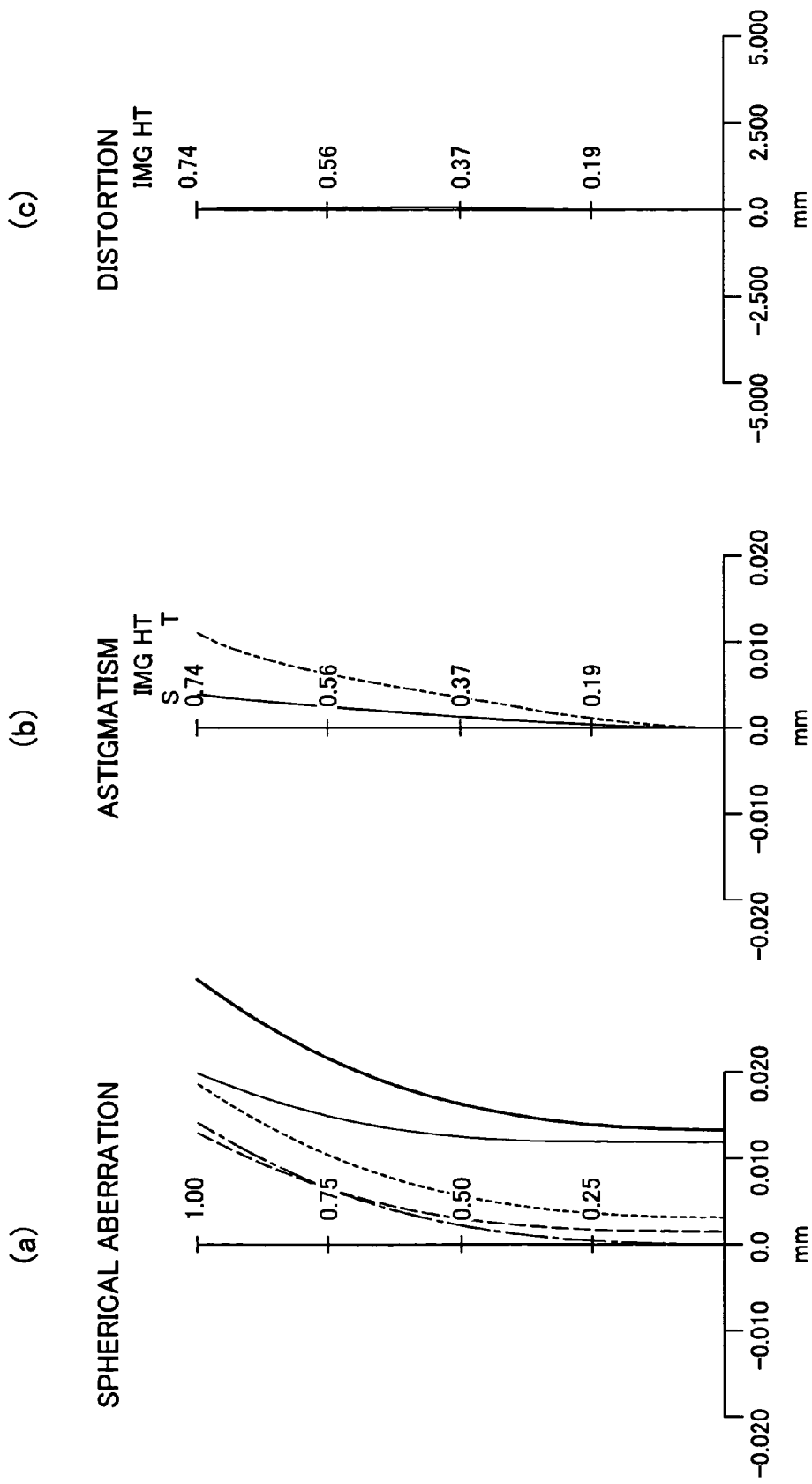
FIG. 3 is a graphical view depicting the spherical aberration, astigmatism, and distortion aberration caused in the exemplary wide-view anti-vibration zoom lens at the telephoto end.

FIG. 3 also graphically depicts the various types of aberration caused in the zoom lens at the telephoto end (focal length of 19.082 mm) where graphs represent (a) spherical aberration, (b) astigmatism, and (c) distortion aberration, respectively.

Figure 4:
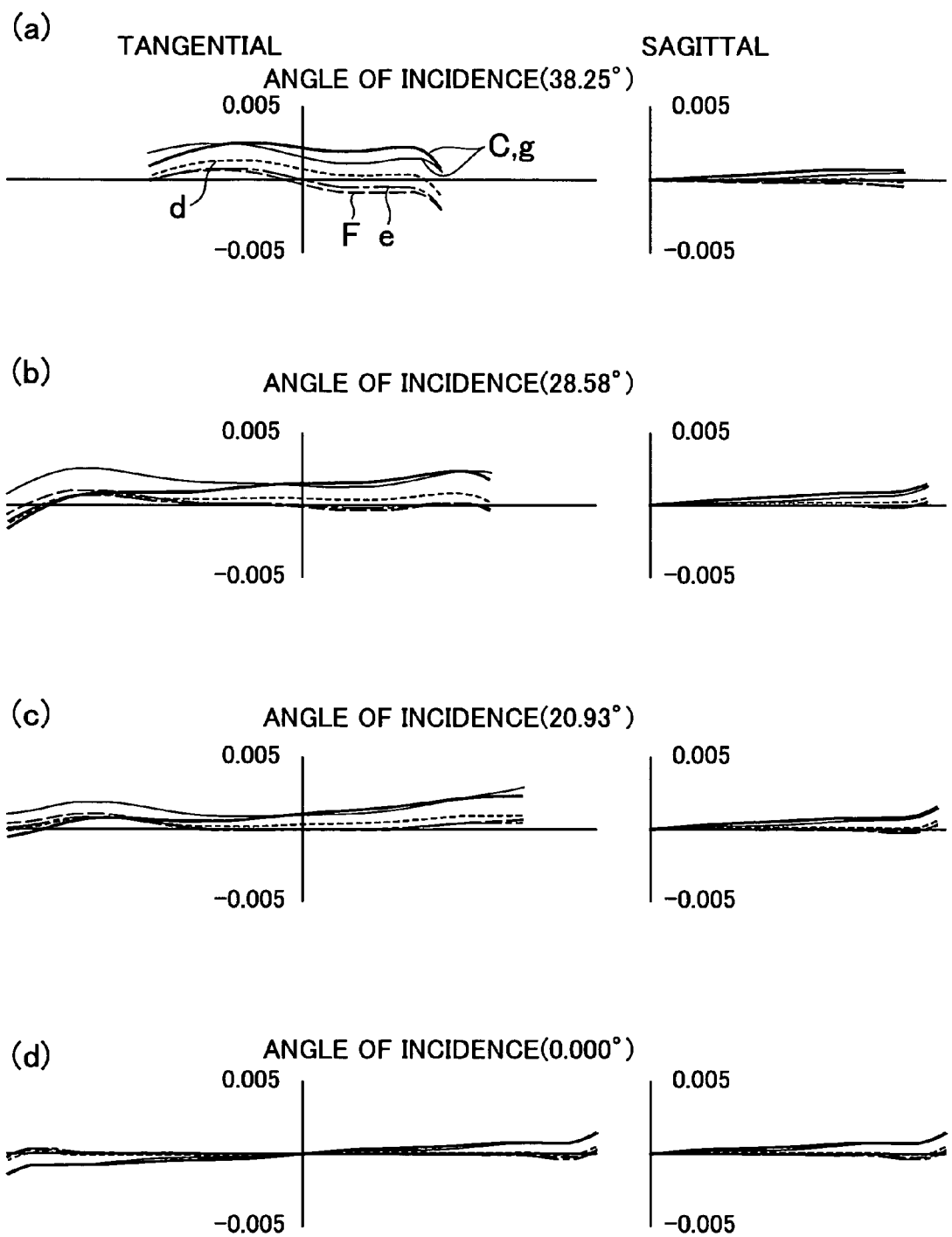
FIG. 4 is a graphical view depicting comatic aberration caused in the exemplary wide-view anti-vibration zoom lens at the wide-angle end.

FIG. 4 graphically depicts comatic aberration under conditions of the varied incident angle of beams, including (a) 38.25 degrees, (b) 28.58 degrees, (c) 20.93 degrees, and (d) 0 degree each of which values is of ½ of the angle of view.

Figure 5:
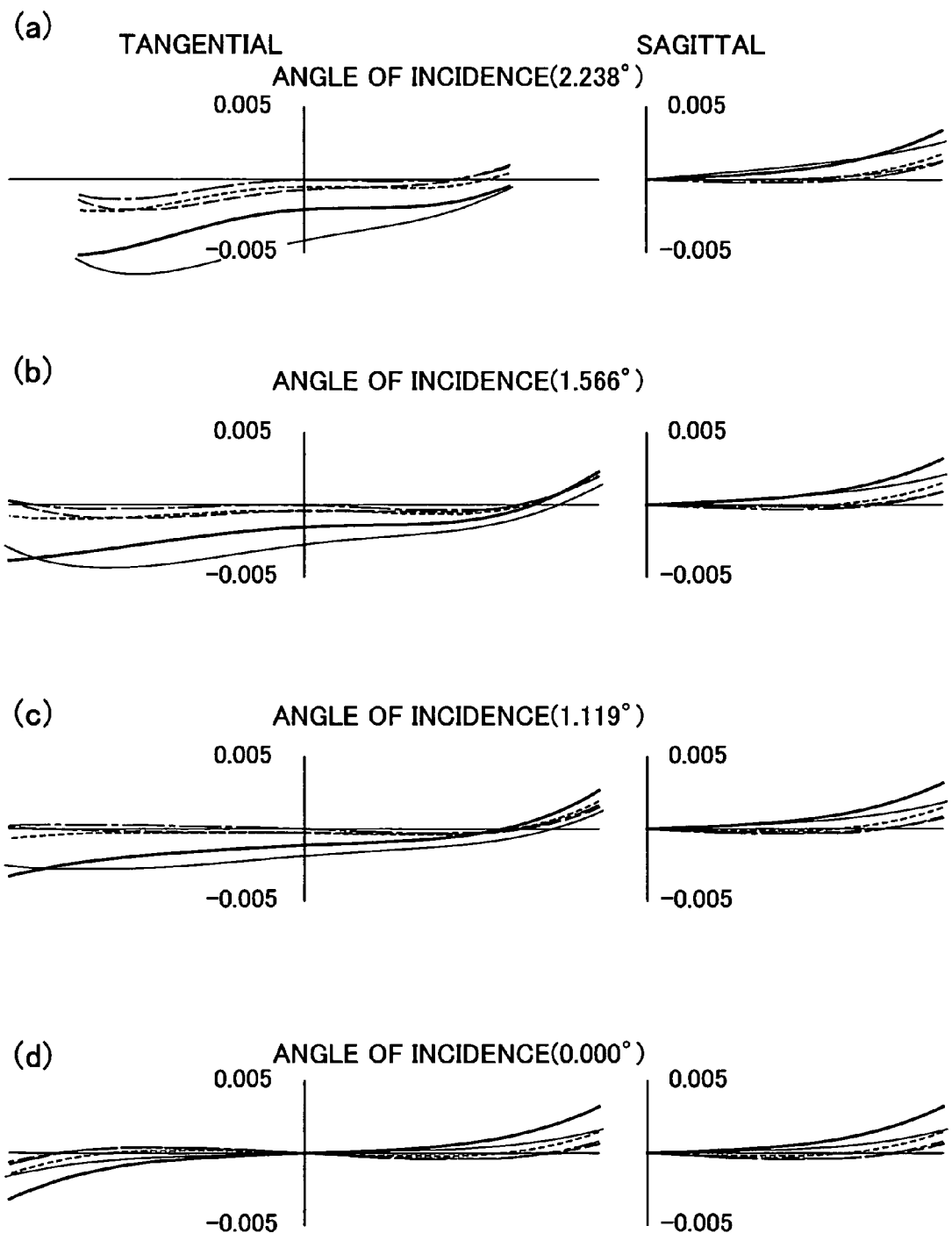
FIG. 5 is a graphical view depicting the comatic aberration caused in the exemplary wide-view anti-vibration zoom lens at the telephoto end.

FIG. 5 graphically depicts the comatic aberration caused in the zoom lens at the telephoto end (focal length of 19.082 mm) under conditions of the varied incident angle of beams, including (a) 2.238 degrees, (b) 1.566 degrees, (c) 1.119 degrees, and (d) 0 degree each of which values is also of ½ of the angle of view.

The first preferred embodiment of the wide-view anti-vibration zoom lens satisfies the requirements given as in the following formulae:

$$f3/f4=3.34 \quad (13\text{-}1)$$

$$v4=67.48 \quad (14\text{-}1)$$

$$BFw/Y=6.798 \quad (15\text{-}1)$$

$$|f1/f2|=6.661 \quad (16\text{-}1)$$

$$0.4<|f1\cdot 1/(v1\times fw)|=0.514 \quad (17\text{-}1)$$

$$H31>H32 \quad (18)$$

$$(R31-R32)/(R31+R32)=-0.0266 \quad (19\text{-}1)$$

Embodiment 2

Various numerical data on a second preferred embodiment of the wide-view anti-vibration zoom lens according to the present invention are listed in Table 2 similar to Table 1 where all the values are scaled to a normalized minimum focal length of 1 millimeter (mm).

TABLE 2

| S | R | D | Nd | ABv |
|---|---|---|---|---|
| 1 | 187.9572 | 0.3910 | 1.90366 | 31.31 |
| 2 | 14.5051 | 2.5979 | 1.49700 | 81.61 |
| 3 | −43.7127 | 0.0355 | | |
| 4 | 14.6879 | 1.5034 | 1.72916 | 54.67 |
| 5 | 84.1369 | 0.0355 | | |
| 6 | 16.2351 | 0.8569 | 1.83481 | 42.72 |

TABLE 2-continued

| 7 | 32.0543 | (D7) | | |
|---|---|---|---|---|
| 8 ASPH | 13.9932 | 0.0474 | 1.53610 | 41.20 |
| 9 | 10.1102 | 0.1896 | 1.88300 | 40.80 |
| 10 | 2.1564 | 1.5658 | | |
| 11 | −3.2917 | 0.1422 | 1.88300 | 40.80 |
| 12 | −14.2180 | 0.0355 | | |
| 13 | 25.7072 | 0.1422 | 1.90366 | 31.31 |
| 14 | 9.7156 | 0.6672 | 1.94595 | 17.98 |
| 15 | −9.7156 | (D15) | | |
| Aperture | 0.0000 | 1.1848 | | |
| 17 | 3.9627 | 0.7054 | 1.66680 | 33.05 |
| 18 | 72.3795 | 0.2133 | 1.81474 | 37.03 |
| 19 ASPH | 4.3789 | 0.4823 | | |
| 20 | 8.9702 | 0.1422 | 1.80610 | 33.27 |
| 21 | 5.3991 | 0.7017 | 1.48749 | 70.44 |
| 22 | −14.5476 | (D22) | | |
| 23 ASPH | 3.4274 | 1.5403 | 1.69350 | 53.34 |
| 24 ASPH | −8.8883 | 0.0355 | | |
| 25 | −19.9651 | 0.1422 | 1.83400 | 37.34 |
| 26 | 2.4171 | 1.1256 | 1.49700 | 81.61 |
| 27 | −7.6964 | (D27) | | |
| 28 | 0.0000 | 0.1019 | 1.51680 | 64.20 |
| 29 | 0.0000 | 0.4645 | 1.61800 | 63.39 |
| 30 | 0.0000 | 0.2915 | | |
| 31 | 0.0000 | 0.4028 | 1.51680 | 64.20 |
| 32 | 0.0000 | 3.6730 | 1.51680 | 64.20 |
| 33 | 0.0000 | | | |

Asphericity

NO 8

K: 0.000000
A: 0.441430E−02    B: −.302347E−03    C: 0.942323E−05
D: −.779714E−06

NO 19

K: 0.000000
A: 0.619937E−03    B: 0.238222E−04    C: 0.207710E−05
D: 0.520394E−06

NO 23

K: 0.000000    KC: 100
A: −.472346E−03    B: −.153297E−03    C: 0.316449E−04
D: 0.293466E−05

NO 24

K: 0.000000    KC: 100
A: 0.389191E−02    B: −.346053E−03    C: 0.935950E−04
D: −.330355E−05

| Focal Length | 1.0000 | 4.5023 | 19.1001 |
|---|---|---|---|
| F-Number | 1.6500 | 2.5600 | 3.5000 |
| 2ω | 76.702 | 18.512 | 4.477 |
| D7 | 0.21327 | 8.50533 | 12.52530 |
| D15 | 12.78615 | 4.49412 | 0.47393 |
| D22 | 3.69930 | 2.34682 | 2.09961 |
| D27 | 0.61417 | 1.96649 | 2.21405 |

In the second preferred embodiment of the wide-view anti-vibration zoom lens, as shown in FIG. 6, the second lens group G2 to the fourth lens group G4 are moved during the zooming. Alphanumeric symbols D7, D15, D22, and D27 in Table 2 respectively designate intervals from one of the lens group to the next for the varied focal length of the optics during the zooming. The focal length is 1 millimeter (mm) in FIG. 6(a), 4.5023 mm in FIG. 6(b), and 19.1001 mm in FIG. 6(c).

Various types of aberration of the second preferred embodiment of the wide-view anti-vibration zoom lens are depicted in FIG. 7 to FIG. 10 similar to FIG. 2 to FIG. 5.

Figure 7:
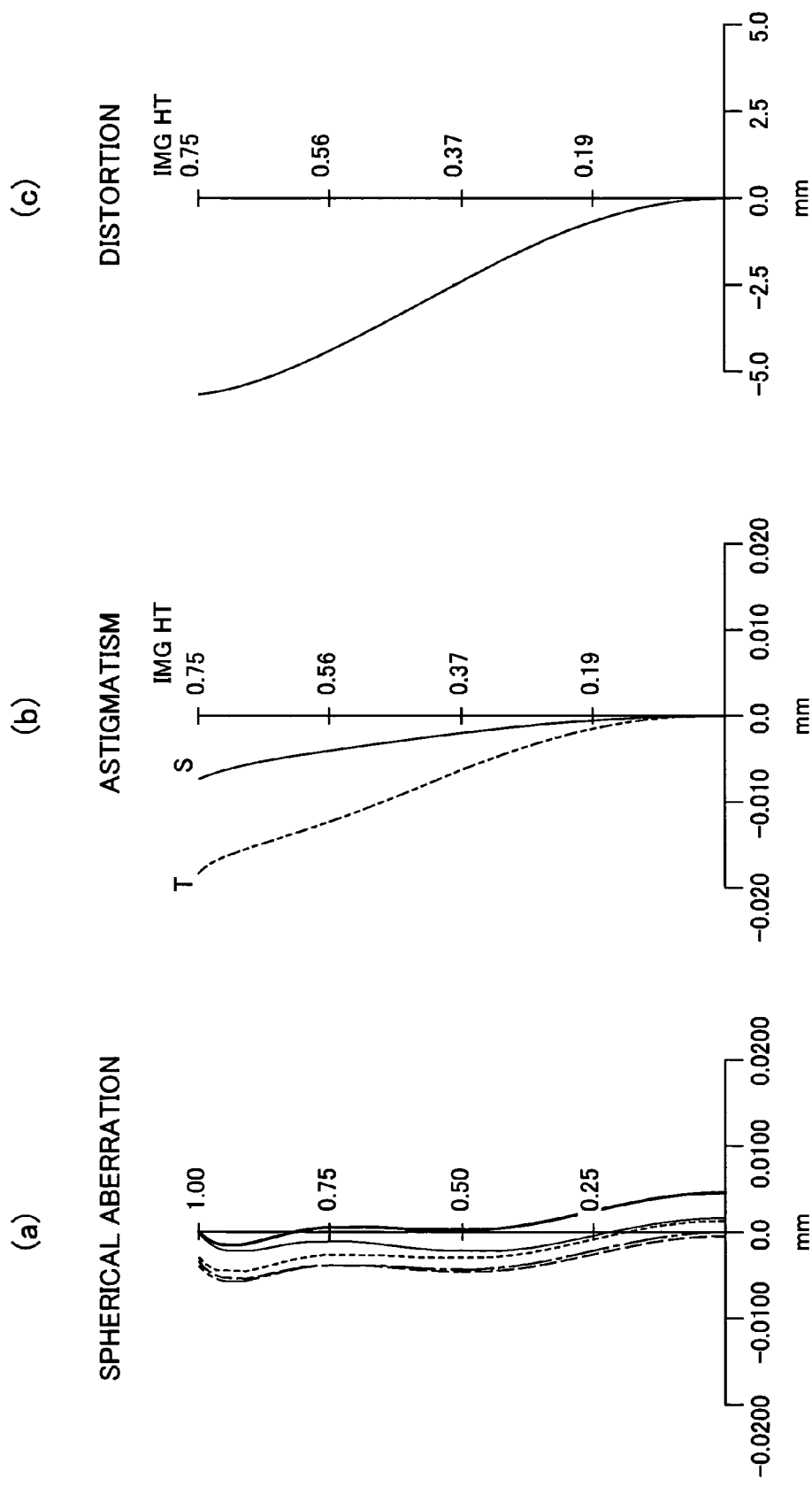
FIG. 7 is a graphical view depicting spherical aberration, astigmatism, and distortion aberration caused in the exemplary wide-view anti-vibration zoom lens at the wide-angle end.

FIG. 7 graphically depicts various types of aberration caused in the zoom lens at the wide-angle end (focal length of 1 mm) where graphs represent (a) spherical aberration, (b) astigmatism, and (c) distortion aberration, respectively.

Figure 8:
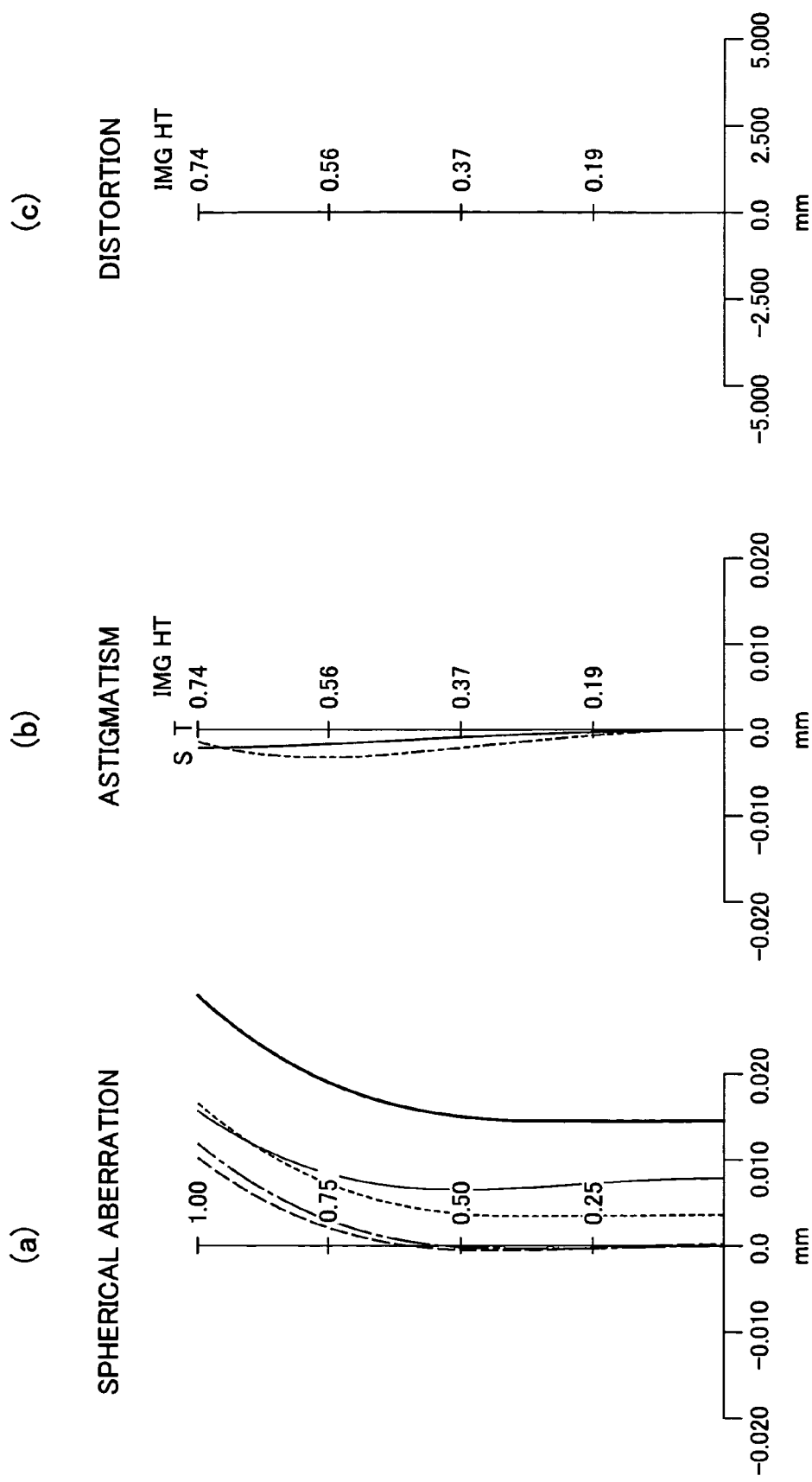
FIG. 8 is a graphical view depicting the spherical aberration, astigmatism, and distortion aberration caused in the exemplary wide-view anti-vibration zoom lens at the telephoto end.

FIG. 8 also graphically depicts the various types of aberration caused in the zoom lens at the telephoto end (focal length of 19.1001 mm) where graphs represent (a) spherical aberration, (b) astigmatism, and (c) distortion aberration, respectively.

Figure 9:
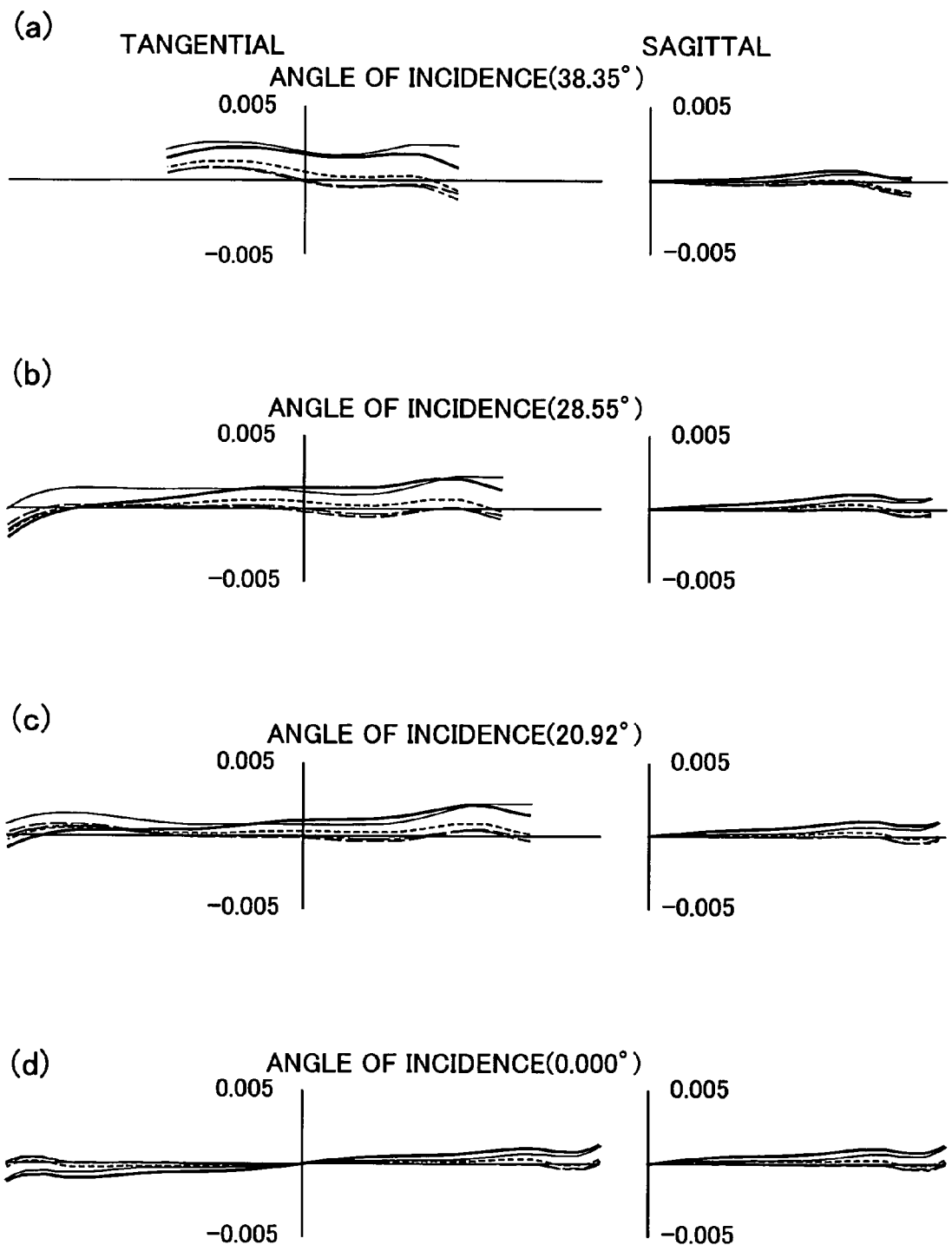
FIG. 9 is a graphical view depicting the comatic aberration caused in the exemplary wide-view anti-vibration zoom lens at the wide-angle end.

FIG. 9 graphically depicts comatic aberration caused in the zoom lens at the wide-angle end (focal length of 1 mm) under conditions of the varied incident angle of beams, including (a) 38.35 degrees, (b) 28.55 degrees, (c) 20.92 degrees, and (d) 0 degree each of which values is of ½ of the angle of view.

Figure 10:
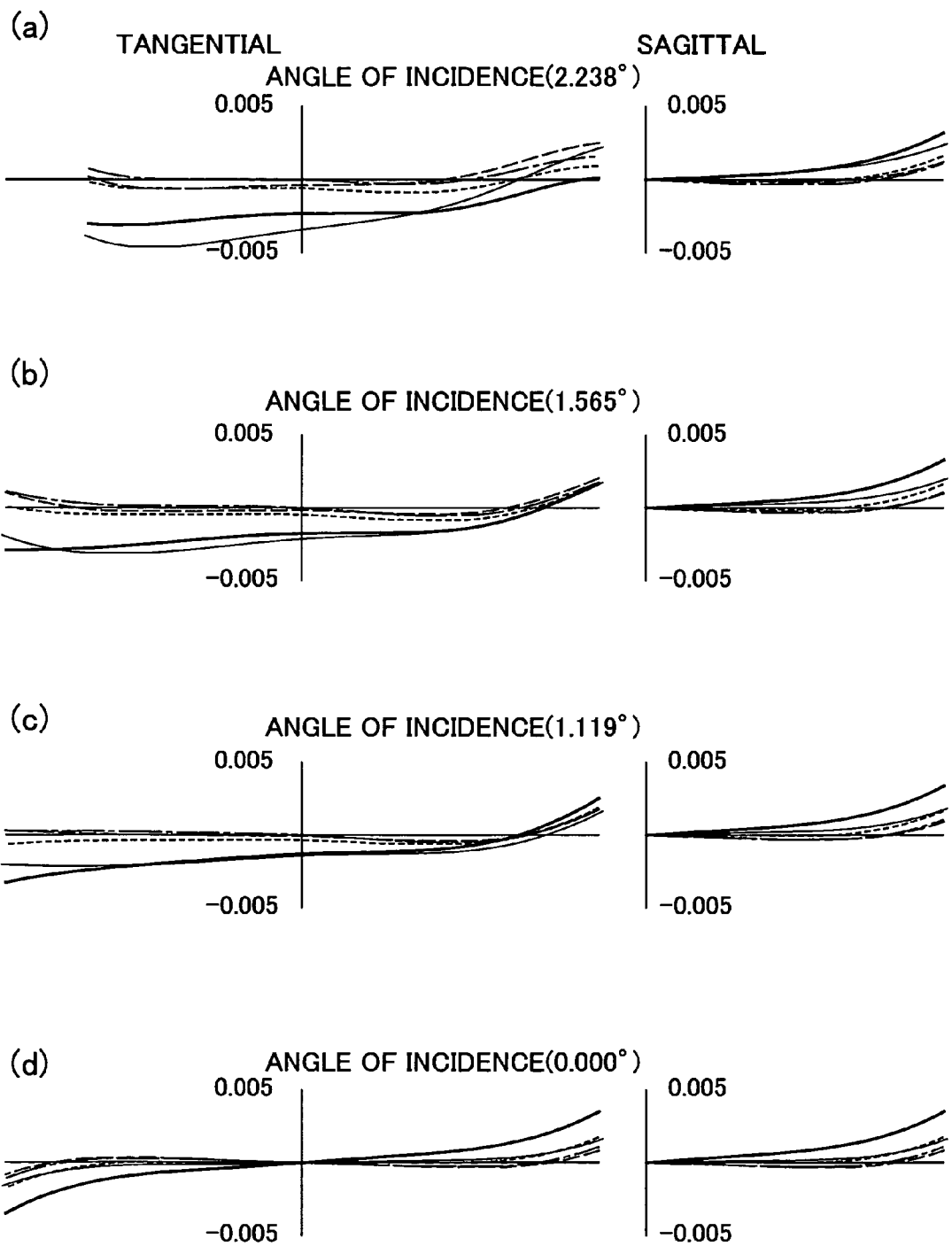
FIG. 10 is a graphical view depicting the comatic aberration caused in the exemplary wide-view anti-vibration zoom lens at the telephoto end.

FIG. 10 graphically depicts the comatic aberration caused in the zoom lens at the telephoto end (focal length of 19.1001 mm) under conditions of the varied incident angle of beams, including (a) 2.238 degrees, (b) 1.565 degrees, (c) 1.119 degrees, and (d) 0 degree each of which values is also of ½ of the angle of view.

The second preferred embodiment of the wide-view anti-vibration zoom lens satisfies the requirements given as in the following formulae:

$$f3/f4 = 2.83 \quad (13\text{-}2)$$

$$v4 = 67.48 \quad (14\text{-}1)$$

$$BFw/Y = 7.019 \quad (15\text{-}2)$$

$$|f1/f2| = 6.901 \quad (16\text{-}2)$$

$$0.4 < |f1 \cdot 1/(v1 \times fw)| = 0.556 \quad (17\text{-}2)$$

$$H31 > H32 \quad (18)$$

$$(R31 - R32)/(R31 + R32) = -0.0499 \quad (19\text{-}2)$$

Embodiment 3

Various numerical data on a third preferred embodiment of the wide-view anti-vibration zoom lens according to the present invention are listed in Table 3 similar to Table 1 where all the values are scaled to a normalized minimum focal length of 1 millimeter (mm).

TABLE 3

| S | R | D | Nd | ABV |
|---|---|---|---|---|
| 1 | 187.2038 | 0.4028 | 1.90366 | 31.31 |
| 2 | 14.5735 | 2.5960 | 1.49700 | 81.61 |
| 3 | −44.7867 | 0.0355 | | |
| 4 | 14.7986 | 1.5404 | 1.72916 | 54.67 |
| 5 | 95.9716 | 0.0355 | | |
| 6 | 16.3270 | 0.8559 | 1.83481 | 42.72 |
| 7 | 31.2796 | (D7) | | |
| 8 ASPH | 17.6748 | 0.0474 | 1.53610 | 41.20 |
| 9 | 11.7523 | 0.1896 | 1.88300 | 40.80 |
| 10 | 2.1934 | 1.5313 | | |
| 11 | −3.3743 | 0.1422 | 1.88300 | 40.80 |
| 12 | −14.2180 | 0.0355 | | |
| 13 | 26.5108 | 0.1422 | 1.90366 | 31.31 |
| 14 | 9.6641 | 0.6703 | 1.94595 | 17.98 |
| 15 | −9.6641 | (D15) | | |
| Aperture | 0.0000 | 1.1848 | | |
| 17 ASPH | 3.4609 | 0.7833 | 1.68893 | 31.16 |
| 18 | 44.0876 | 0.1422 | 1.80610 | 33.27 |
| 19 | 3.6180 | 0.5368 | | |
| 20 | 8.0360 | 0.1422 | 1.80610 | 33.27 |
| 21 | 4.9364 | 0.7131 | 1.48749 | 70.44 |
| 22 | −15.9885 | 3.6402 | | |
| 23 ASPH | 3.3850 | 1.5006 | 1.69350 | 53.34 |
| 24 ASPH | −8.8783 | 0.0355 | | |
| 25 | −20.0260 | 0.1422 | 1.83400 | 37.34 |
| 26 | 2.4171 | 1.1653 | 1.49700 | 81.61 |
| 27 | −7.7420 | (D27) | | |
| 28 | 0.0000 | 0.1019 | 1.51680 | 64.20 |
| 29 | 0.0000 | 0.4645 | 1.61800 | 63.39 |
| 30 | 0.0000 | 0.2915 | | |

TABLE 3-continued

| 31 | 0.0000 | 0.4028 | 1.51680 | 64.20 |
|---|---|---|---|---|
| 32 | 0.0000 | 3.6730 | 1.51680 | 64.20 |
| 33 | 0.0000 | 0.00 | | |

| Asphericity | | |
|---|---|---|
| NO 8 | | |
| K: 0.000000 | | |
| A: 0.455156E−02 | B: −.351639E−03 | C: 0.207200E−04 |
| D: −.141884E−05 | | |
| NO 17 | | |
| K: 0.000000 | | |
| A: −.599626E−03 | B: −.315997E−04 | C: −.512130E−05 |
| D: −.300620E−06 | | |
| NO 23 | | |
| K: 0.000000 | | |
| A: −.467940E−03 | B: −.302658E−03 | C: 0.654116E−04 |
| D: −.204795E−05 | | |
| NO 24 | | |
| K: 0.000000 | | |
| A: 0.411688E−02 | B: −.619840E−03 | C: 0.162231E−03 |
| D: −.120261E−04 | | |

| Focal Length | 1.000 | 4.500 | 19.042 |
|---|---|---|---|
| F-Number | 1.65 | 2.60 | 3.60 |
| 2ω | 76.76 | 18.52 | 4.487 |
| D7 | 0.2133 | 8.5862 | 12.6312 |
| D15 | 12.8918 | 4.5189 | 0.4739 |
| D22 | 3.6402 | 2.2958 | 2.0626 |
| D27 | 0.4803 | 1.8247 | 2.0578 |

Figure 11:
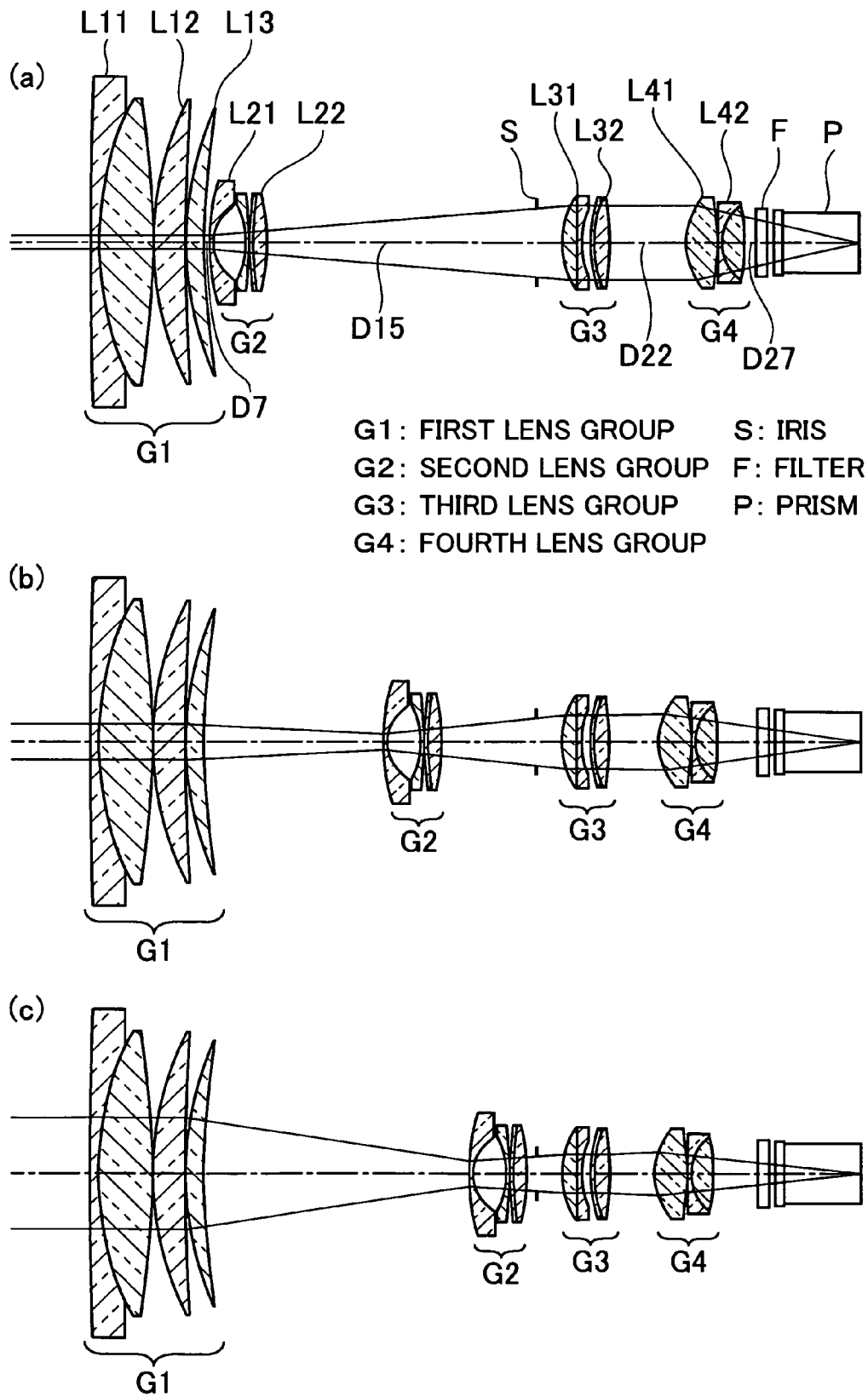
FIG. 11 is a sectional view showing the optics of a third preferred embodiment of the wide-view anti-vibration zoom lens in accordance with the present invention.

In the third preferred embodiment of the wide-view anti-vibration zoom lens, as shown in FIG. 11, the second lens group G2 to the fourth lens group G4 are moved during the zooming. Alphanumeric symbols D7, D15, D22, and D27 in Table 3 respectively designate intervals from one of the lens group to the next for the varied focal length of the optics during the zooming. The focal length is 1 millimeter (mm) in FIG. 11(*a*), 4.5000 mm in FIG. 11(*b*), and 19.042 mm in FIG. 11(*c*).

Various types of aberration of the third preferred embodiment of the wide-view anti-vibration zoom lens are depicted in FIG. 12 to FIG. 15 similar to FIG. 2 to FIG. 5.

Figure 12:
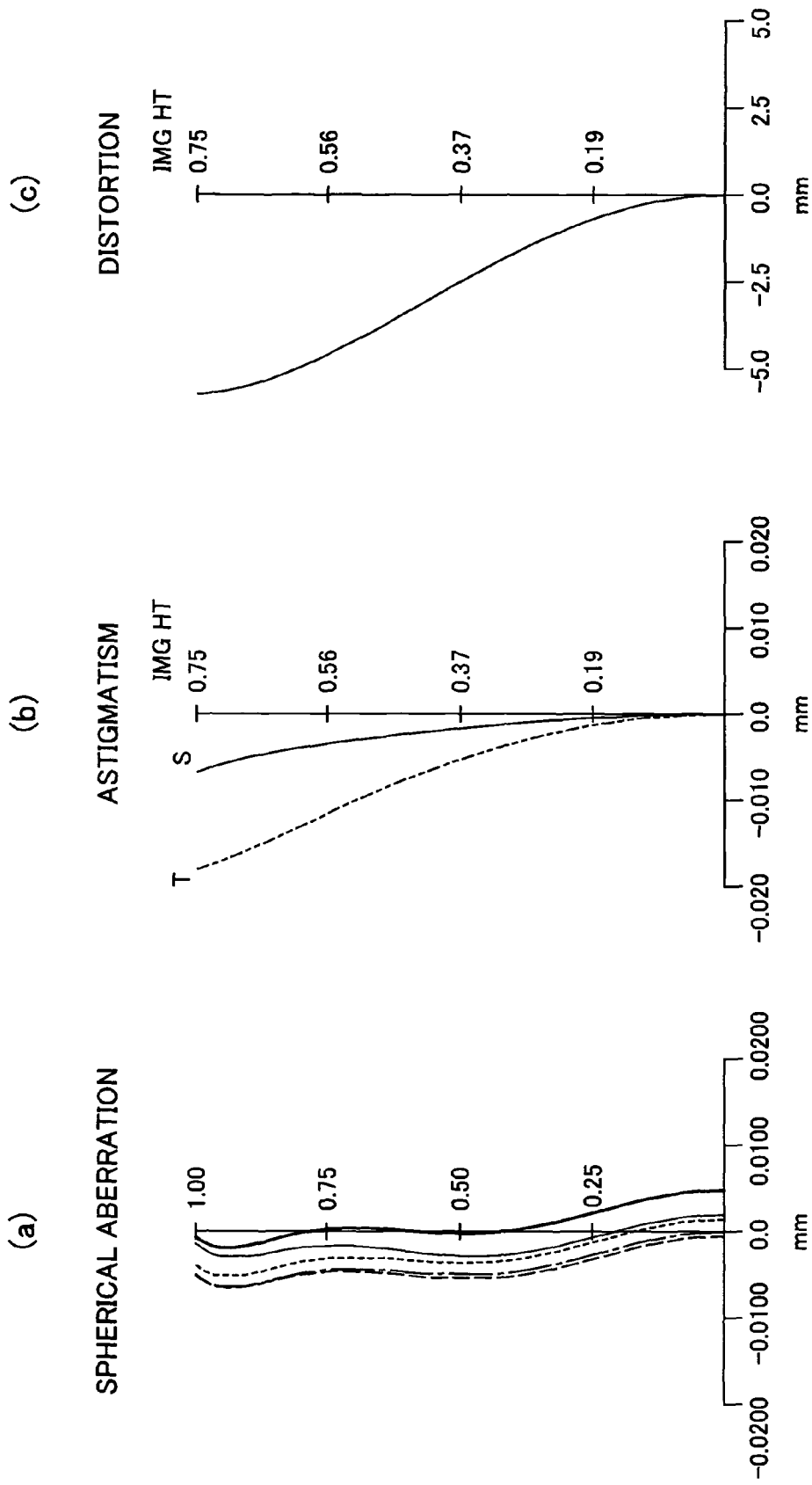
FIG. 12 is a graphical view depicting the spherical aberration, astigmatism, and distortion aberration caused in the exemplary wide-view anti-vibration zoom lens at the wide-angle end.

FIG. 12 graphically depicts various types of aberration caused in the zoom lens at the wide-angle end (focal length of 1 mm) where graphs represent (a) spherical aberration, (b) astigmatism, and (c) distortion aberration, respectively.

Figure 13:
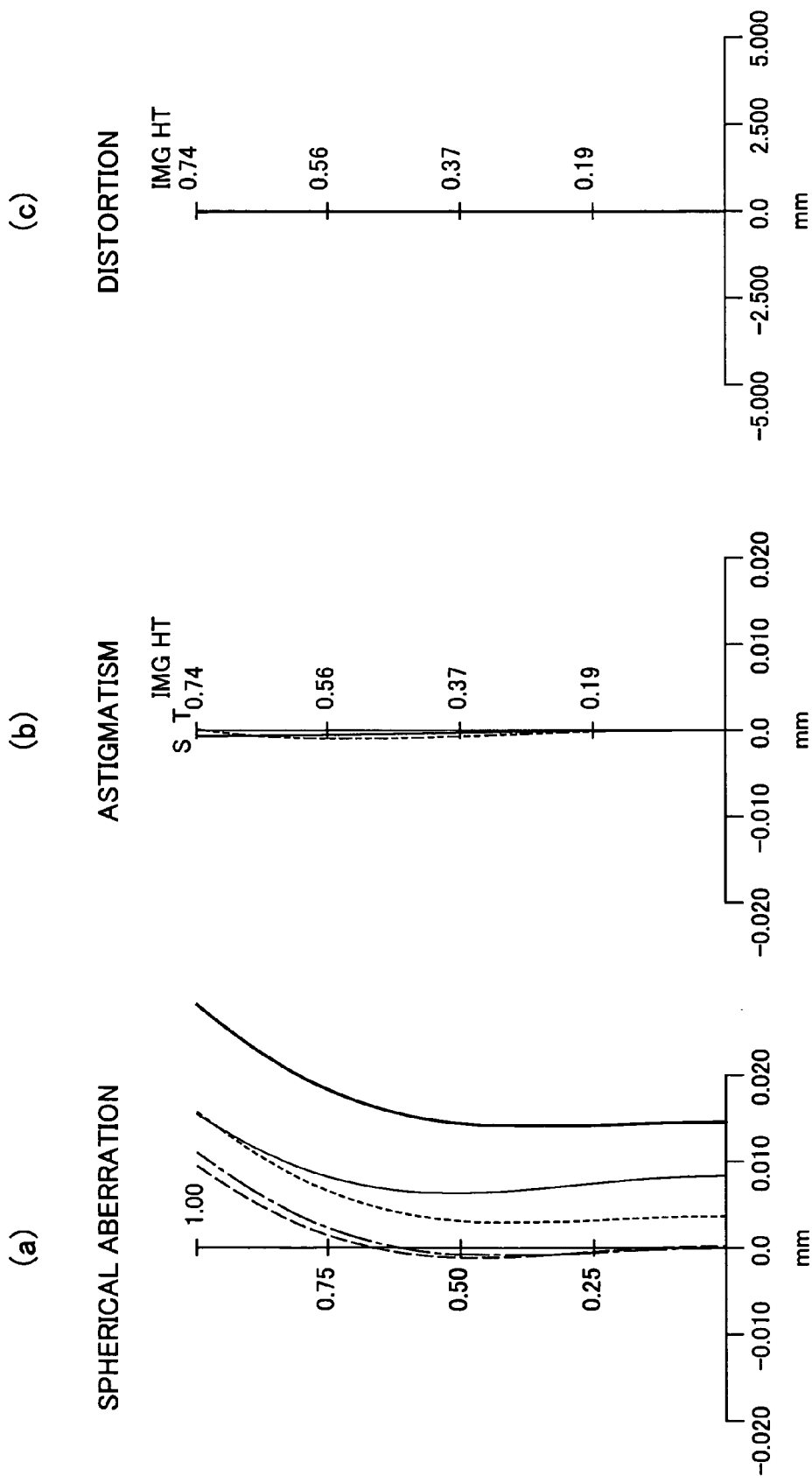
FIG. 13 is a graphical view depicting the spherical aberration, astigmatism, and distortion aberration caused in the exemplary wide-view anti-vibration zoom lens at the telephoto end.

FIG. 13 also graphically depicts the various types of aberration caused in the zoom lens at the telephoto end (focal length of 19.042 mm) where graphs represent (a) spherical aberration, (b) astigmatism, and (c) distortion aberration, respectively.

Figure 14:
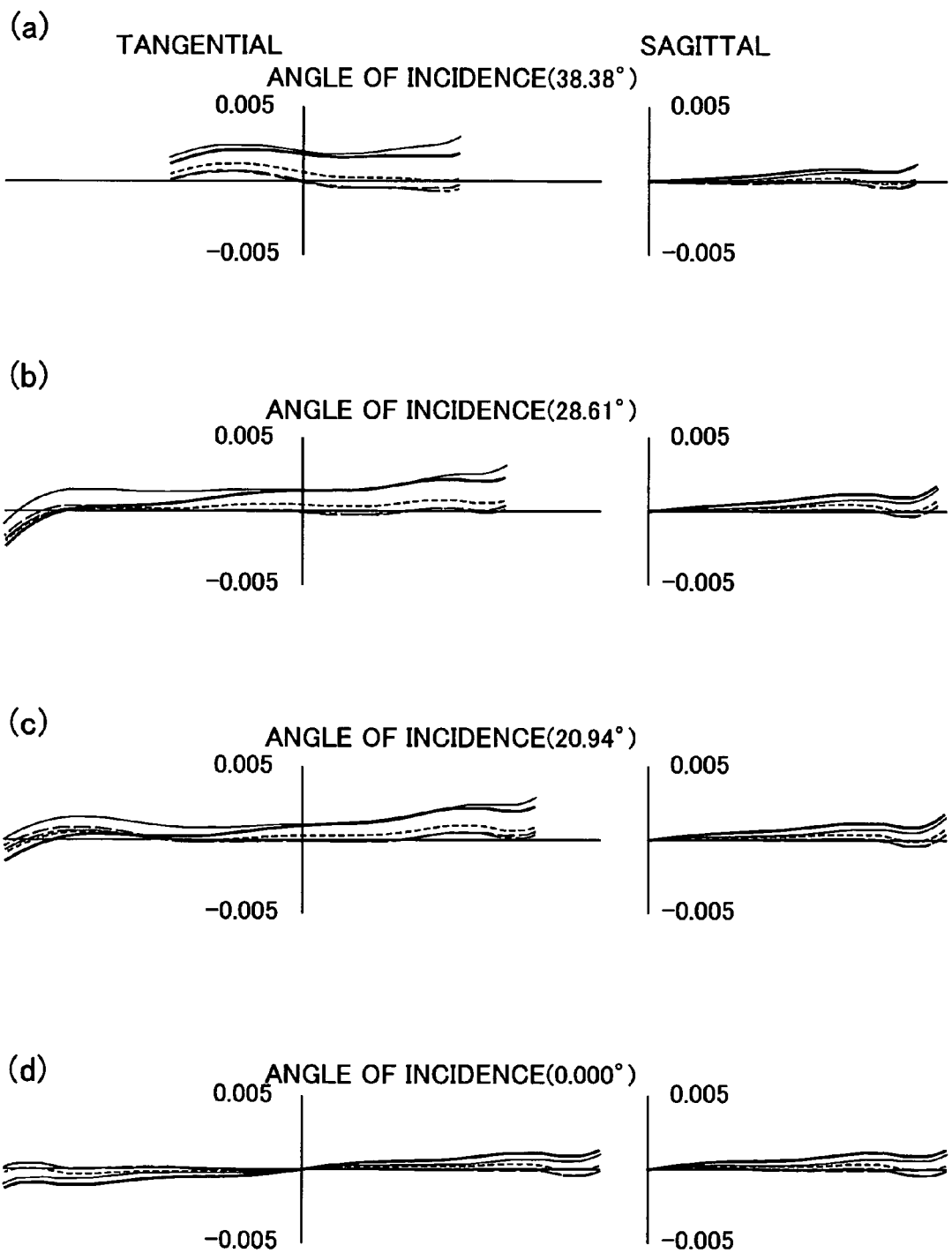
FIG. 14 is a graphical view depicting the comatic aberration caused in the exemplary wide-view anti-vibration zoom lens at the wide-angle end.

FIG. 14 graphically depicts comatic aberration caused in the zoom lens at the wide-angle end (focal length of 1 mm) under conditions of the varied incident angle of beams, including (a) 38.38 degrees, (b) 28.61 degrees, (c) 20.94 degrees, and (d) 0 degree each of which values is of ½ of the angle of view.

Figure 15:
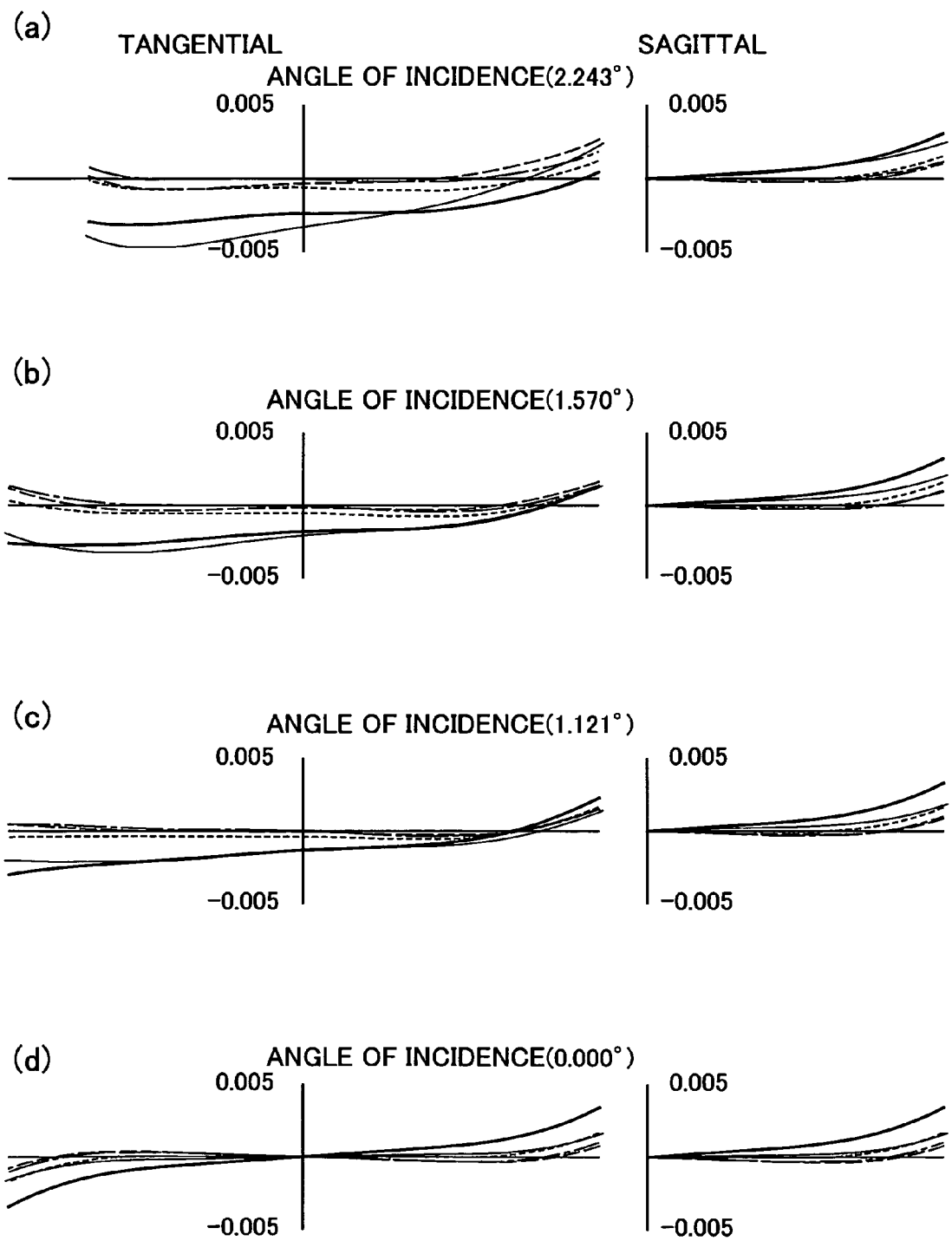
FIG. 15 is a graphical view depicting the comatic aberration caused in the exemplary wide-view anti-vibration zoom lens at the telephoto end.

FIG. 15 graphically depicts the comatic aberration caused in the zoom lens at the telephoto end (focal length of 19.042 mm) under conditions of the varied incident angle of beams, including (a) 2.243 degrees, (b) 1.570 degrees, (c) 1.121 degrees, and (d) 0 degree each of which values is also of ½ of the angle of view.

The third preferred embodiment of the wide-view anti-vibration zoom lens satisfies the requirements given as in the following formulae:

$$f3/f4 = 2.75 \tag{13-3}$$

$$v4 = 67.48 \tag{14-1}$$

$$BFw/Y = 6.843 \tag{15-3}$$

$$|f1/f2| = 6.961 \tag{16-3}$$

$$0.4 < |f1 \cdot 1/(v1 \times fw)| = 0.559 \tag{17-3}$$

$$H31 > H32 \tag{18}$$

$$(R31 - R32)/(R31 + R32) = -0.0222 \tag{19-3}$$

The prior art embodiment in the cited Patent Document 1 as a first aspect meets the requirements given as in the following formulae:

$$f3/f4 = 1.056 \tag{13-4}$$

$$v4 = 61.85 \tag{14-2}$$

$$BFw/Y = 8.542 \tag{15-4}$$

$$|f1/f2| = 6.398 \tag{16-4}$$

$$0.4 < |f1 \cdot 1/(v1 \times fw)| = 1.4465 \tag{17-4}$$

$$H31 < H32 \tag{18-1}$$

$$(R31 - R32)/(R31 + R32) = -0.636 \tag{19-4}$$

A second embodiment in the cited Patent Document 1 meets the requirements given as in the following formulae:

$$f3/f4 = 1.057 \tag{13-5}$$

$$v4 = 61.85 \tag{14-2}$$

$$BFw/Y = 8.536 \tag{15-5}$$

$$|f1/f2| = 6.276 \tag{16-5}$$

$$0.4 < |f1 \cdot 1/(v1 \times fw)| = 1.713 \tag{17-5}$$

$$H31 < H32 \tag{18-1}$$

$$(R31 - R32)/(R31 + R32) = -0.405 \tag{19-5}$$

A third embodiment in the cited Patent Document 1 satisfies the requirements given as in the following formulae:

$$f3/f4 = 0.983 \tag{13-6}$$

$$v4 = 65.85 \tag{14-3}$$

$$BFw/Y = 8.630 \tag{15-6}$$

$$|f1/f2| = 6.283 \tag{16-6}$$

$$0.4 < |f1 \cdot 1/(v1 \times fw)| = 1.656 \tag{17-6}$$

$$H31 < H32 \tag{18-1}$$

$$(R31 - R32)/(R31 + R32) = -0.533 \tag{19-6}$$

A fourth embodiment in the cited Patent Document 1 meets the requirements given as in the following formulae:

$$f3/f4 = 1.368 \tag{13-7}$$

$$v4 = 65.85 \tag{14-3}$$

$$BFw/Y = 9.970 \tag{15-7}$$

$$|f1/f2| = 6.152 \tag{16-7}$$

$$0.4 < |f1 \cdot 1/(v1 \times fw)| = 0.692 \tag{17-7}$$

$$H31 < H32 \tag{18-1}$$

$$(R31 - R32)/(R31 + R32) = -0.481 \tag{19-7}$$

The prior art embodiment in the cited Patent Document 2 as a first aspect meets the requirements as in the following formulae:

$$f3/f4 = 1.709 \tag{13-8}$$

$$v4 = 50.55 \tag{14-4}$$

$$BFw/Y = 9.972 \tag{15-8}$$

$$|f1/f2| = 5.728 \tag{16-8}$$

$$0.4 < |f1 \cdot 1/(v1 \times fw)| = 0.722 \tag{17-8}$$

$$H31 < H32 \tag{18-1}$$

$$(R31 - R32)/(R31 + R32) = -0.142 \tag{19-8}$$

A second embodiment in the cited Patent Document 2 meets the requirements as in the following formulae:

$$f3/f4 = 2.026 \tag{13-9}$$

$$v4 = 52.1 \tag{14-5}$$

$$BFw/Y = 10.488 \tag{15-9}$$

$$|f1/f2| = 5.797 \tag{16-9}$$

$$0.4 < |f1 \cdot 1/(v1 \times fw)| = 0.696 \tag{17-9}$$

$$H31 < H32 \tag{18-1}$$

$$(R31 - R32)/(R31 + R32) = -0.222 \tag{19-9}$$

A third embodiment in the cited Patent Document 2 meets the requirement as in the following formulae:

$$f3/f4 = 2.232 \tag{13-10}$$

$$v4 = 50.55 \tag{14-6}$$

$$BFw/Y = 10.496 \tag{15-10}$$

$$|f1/f2| = 5.745 \tag{16-10}$$

$$0.4 < |f1 \cdot 1/(v1 \times fw)| = 0.705 \tag{17-10}$$

$$H31 < H32 \tag{18-1}$$

$$(R31 - R32)/(R31 + R32) = -0.245 \tag{19-10}$$

The prior art embodiment in the cited Patent Document 3 as a first aspect satisfies the requirements given as in the following formulae: as in the following formulae:

$$f3/f4 = 1.762 \tag{13-11}$$

$$v4 = 70.55 \tag{14-7}$$

$BFw/Y=11.486$ (15-11)

$|f1/f2|=5.099$ (16-11)

$0.4<|f1\cdot 1/(v1\times fw)|=0.639$ (17-11)

$H31<H32$ (18-1)

$(R31-R32)/(R31+R32)=-0.144$ (19-11)

A second embodiment in the cited Patent Document 3 meets the requirements as in the following formulae:

$f3/f4=1.533$ (13-12)

$v4=59.9$ (14-8)

$BFw/Y=11.657$ (15-12)

$|f1/f2|=5.618$ (16-12)

$0.4<|f1\cdot 1/(v1\times fw)|=0.840$ (17-12)

$H31<H32$ (18-1)

$(R31-R32)/(R31+R32)=-0.231$ (19-12)

A third embodiment in the cited Patent Document 3 meets the requirements as in the following formulae:

$f3/f4=1.347$ (13-13)

$v4=57.5$ (14-9)

$BFw/Y=11.540$ (15-13)

$|f1/f2|=5.623$ (16-13)

$0.4<|f1\cdot 1/(v1\times fw)|=0.736$ (17-13)

$H31<H32$ (18-1)

$(R31-R32)/(R31+R32)=-0.160$ (19-13)

A fourth embodiment in the cited Patent Document 3 meets the requirements as in the following formulae:

$f3/f4=1.352$ (13-14)

$v4=57.5$ (14-9)

$BFw/Y=11.594$ (15-14)

$|f1/f2|=5.678$ (16-14)

$0.4<|f1\cdot 1/(v1\times fw)|=0.854$ (17-14)

$H31<H32$ (18-1)

$(R31-R32)/(R31+R32)=-0.165$ (19-14)

A fifth embodiment in the cited Patent Document 3 meets the requirements as in the following formulae:

$f3/f4=1.276$ (13-15)

$v4=64.95$ (14-10)

$BFw/Y=9.486$ (15-15)

$|f1/f2|=5.513$ (16-15)

$0.4<|f1\cdot 1/(v1\times fw)|=0.744$ (17-15)

$H31<H32$ (18-1)

$(R31-R32)/(R31+R32)=-0.161$ (19-15)

A sixth embodiment in the cited Patent Document 3 meets the requirements as in the following formulae:

$f3/f4=1.626$ (13-16)

$v4=61.85$ (14-11)

$BFw/Y=11.628$ (15-16)

$|f1/f2|=5.641$ (16-16)

$0.4<|f1\cdot 1/(v1\times fw)|=0.834$ (17-16)

$H31<H32$ (18-1)

$(R31-R32)/(R31+R32)=-0.089$ (19-16)

A seventh embodiment in the cited Patent Document 3 meets the requirements as in the following formulae:

$f3/f4=1.801$ (13-17)

$v4=59.5$ (14-12)

$BFw/Y=11.656$ (15-17)

$|f1/f2|=4.272$ (16-17)

$0.4<|f1\cdot 1/(v1\times fw)|=0.372$ (17-17)

$H31<H32$ (18-1)

$(R31-R32)/(R31+R32)=-0.300$ (19-17)

What is claimed is:

1. A high magnification compact zoom lens comprising;
a first lens group of positive refractivity a second lens group of negative refractivity, a third lens group of positive refractivity, and a fourth lens group of positive refractivity, in order from the object side;
the second lens group being movable toward the imaging plane and the fourth lens group being movable to compensate for a varied position of the resultant image while the first and third lens groups have their respective positions fixed along the optical axis, when the entire lens optics of the zoom lens are displaced from the wide-angle end to the telephoto end; and
wherein the zoom lens satisfies the requirements as defined in the following formulae:

$f3/f4>2.0$ (13)

$v4>65$ (14)

where f3 is a focal length of the third lens group, f4 is the focal length of the fourth lens group, and v4 is an average of Abbe constants of all positive lens pieces in the fourth lens group.

2. A high magnification compact zoom lens according to claim 1, wherein the fourth lens group has one or more of the lens pieces provided with an aspherical surface on at least one of the opposite sides thereof.

3. A high magnification compact zoom lens comprising;
a first lens group of positive refractivity a second lens group of positive refractivity, a third lens group of positive refractivity, and a fourth lens group of positive refractivity, in order from the object side;
the second lens group being movable toward the imaging plane and the fourth lens group being movable compensate for a varied position of the resultant image while the first and third lens groups have their respective positions fixed along the optical axis, when the entire lens optics of the zoom lens are displaced from the wide-angle end to the telephoto end; and wherein the zoom lens satisfies the requirements as defined in the following formulae:

$$f3/f4 > 2.0 \qquad (13)$$

$$6.0 < BFw/Y < 8.0 \qquad (14)$$

where f3 is a focal length of the third lens group, f4 is the focal length of the fourth lens group, BFw is a distance between a rearmost surface of the fourth lens group and the imaging plane at the wide-angle end, and Y is a height of the greatest image created in the imaging plane.

4. A high magnification wide-view zoom lens comprising;

a first lens group of positive refractivity a second lens group of negative refractivity, a third lens group of positive refractivity, and a fourth lens group of positive refractivity, in order from the object side;

the second lens group being movable toward the imaging plane and the fourth lens group being movable to compensate for a varied position of the resultant image while the first and third lens groups have their respective positions fixed along the optical axis, when the entire lens optics of the zoom lens are displaced from the wide-angle end to the telephoto end; and wherein the zoom lens satisfies the requirements as defined in the following formulae:

$$|f1/f2| > 6.5 \qquad (16)$$

$$0.4 < |f1_1/(v1 \times fw)| < 0.6 \qquad (17)$$

where f1 is the focal length of the first lens group, f2 is the focal length of the second lens group, $f1_1$ is the focal length of the foremost lens piece of the first lens group, v1 is an Abbe constant of the foremost lens piece of the first lens group, and fw is the focal length of the zoom lens at the wide angle end.

5. A high magnification wide-view zoom lens comprising;

a first lens group of positive refractivity a second lens group of negative refractivity, a third lens group of positive refractivity, and a fourth lens group of positive refractivity, in order from the object side;

the second lens group toward the imaging plane and the fourth lens group being movable to compensate for a varied position of the resultant image while the first and third lens groups have their respective positions fixed along the optical axis, when the entire lens optics are displaced from the wide-angle end to the telephoto end; and wherein the zoom lens satisfies the requirements as defined in the following formulae:

$$|f1/f2| > 6.5 \qquad (16)$$

$$0.4 < |f1_1/(v1 \times fw)| < 0.6 \qquad (17)$$

where f1 is a focal length of the first lens group, f2 is the focal length of the second lens group, $f1_1$ is the focal length of the foremost lens piece of the first lens group, v1 is an Abbe constant of the foremost lens piece of the first lens group, and fw is the focal length of the zoom lens at the wide-angle end; and the second lens group has one or more of the lens pieces provided with an aspherical surface on at least one of the opposite sides thereof.

* * * * *